United States Patent
Zhou et al.

(10) Patent No.: US 12,498,857 B2
(45) Date of Patent: Dec. 16, 2025

(54) METHOD FOR WRITING DATA TO SOLID-STATE DRIVE

(71) Applicant: Huawei Technologies Co., Ltd., Shenzhen (CN)

(72) Inventors: Wen Zhou, Shanghai (CN); Zhen Cheng, Shanghai (CN); Yi Su, Shanghai (CN); Hongfeng Jiang, Baku (AZ)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/477,160

(22) Filed: Sep. 28, 2023

(65) Prior Publication Data

US 2024/0020014 A1 Jan. 18, 2024

Related U.S. Application Data

(63) Continuation of application No. PCT/CN2022/077686, filed on Feb. 24, 2022.

(30) Foreign Application Priority Data

Apr. 8, 2021 (CN) .......................... 202110378320.0
Jun. 15, 2021 (CN) .......................... 202110662875.8

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 10,901,917 | B1 * | 1/2021 | Volpe | G06F 12/1408 |
|---|---|---|---|---|
| 2010/0293321 | A1 | 11/2010 | Weingarten | |
| 2011/0167197 | A1 | 7/2011 | Leinwander | |
| 2016/0239205 | A1 | 8/2016 | Rothberg | |
| 2018/0018171 | A1 * | 1/2018 | Amidi | G06F 3/0679 |
| 2018/0136851 | A1 * | 5/2018 | Batra | G06F 3/0659 |
| 2018/0136878 | A1 * | 5/2018 | Madpur | G11C 7/10 |

(Continued)

FOREIGN PATENT DOCUMENTS

| CN | 102662856 A | 9/2012 |
|---|---|---|
| CN | 105630700 A | 6/2016 |

(Continued)

OTHER PUBLICATIONS

Smullen C W et al, "Accelerating Enterprise Solid-State Disks with Non-Volatile Merge Caching," International Conference on Green Computing Conference, Piscataway, NJ, USA, Aug. 15, 2010 (Aug. 15, 2010), XP031773138, 12 pages.

(Continued)

*Primary Examiner* — Stephanie Wu
(74) *Attorney, Agent, or Firm* — Conley Rose, P.C.

(57) ABSTRACT

In a method for writing data to a solid-state drive, both a byte-level write interface and a page-level write interface are provided. Full-page input/output (I/O) data is written to a flash chip through the page-level interface, and small I/O data is written to a storage class memory (SCM) chip through the byte-level interface.

17 Claims, 10 Drawing Sheets

(56) References Cited

U.S. PATENT DOCUMENTS

| | | | | |
|---|---|---|---|---|
| 2018/0349041 A1* | 12/2018 | Zhou | ................. | G06F 3/0619 |
| 2019/0042152 A1* | 2/2019 | Trika | ................. | H04L 67/1097 |
| 2019/0303284 A1* | 10/2019 | Trika | ................. | G06F 3/0622 |
| 2019/0339904 A1* | 11/2019 | Myran | ................. | G06F 3/0688 |
| 2020/0081853 A1* | 3/2020 | Caraccio | ................. | G06F 13/28 |
| 2020/0272566 A1 | 8/2020 | Saeki | | |
| 2020/0334147 A1* | 10/2020 | Dubeyko | ................. | G06F 3/0679 |
| 2021/0141736 A1* | 5/2021 | Manzanares | ................. | G06F 3/0656 |

FOREIGN PATENT DOCUMENTS

| | | |
|---|---|---|
| CN | 111625191 A | 9/2020 |
| CN | 112035065 A | 12/2020 |
| GB | 2519629 A | 4/2015 |

OTHER PUBLICATIONS

Sun Chao, et al, "A Workload-aware-design of 3D-NAND flash memory for enterprise SSDs," 15th International Symposium on Quality Electronic Design, Mar. 3, 2014, XP32584752 8 pages.

\* cited by examiner (a) Byte-level write (b) Page-level write

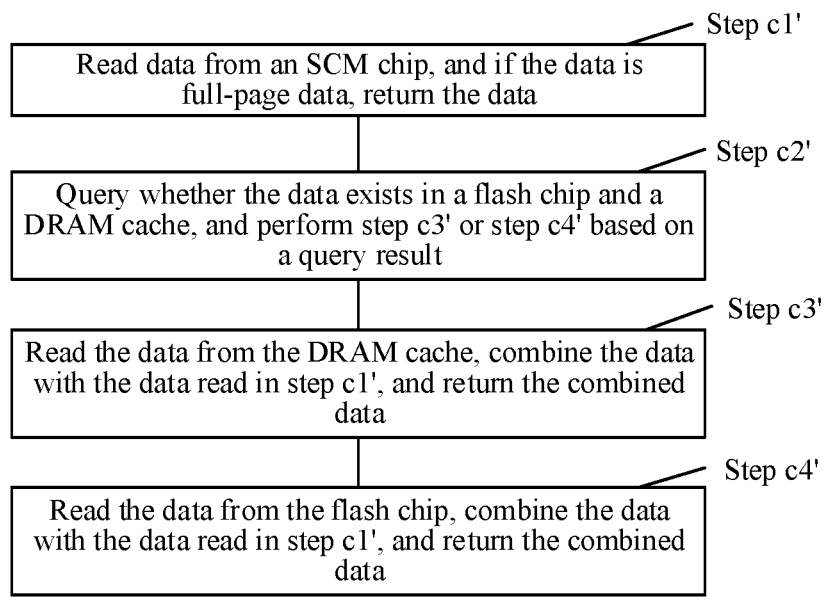
FIG. 12
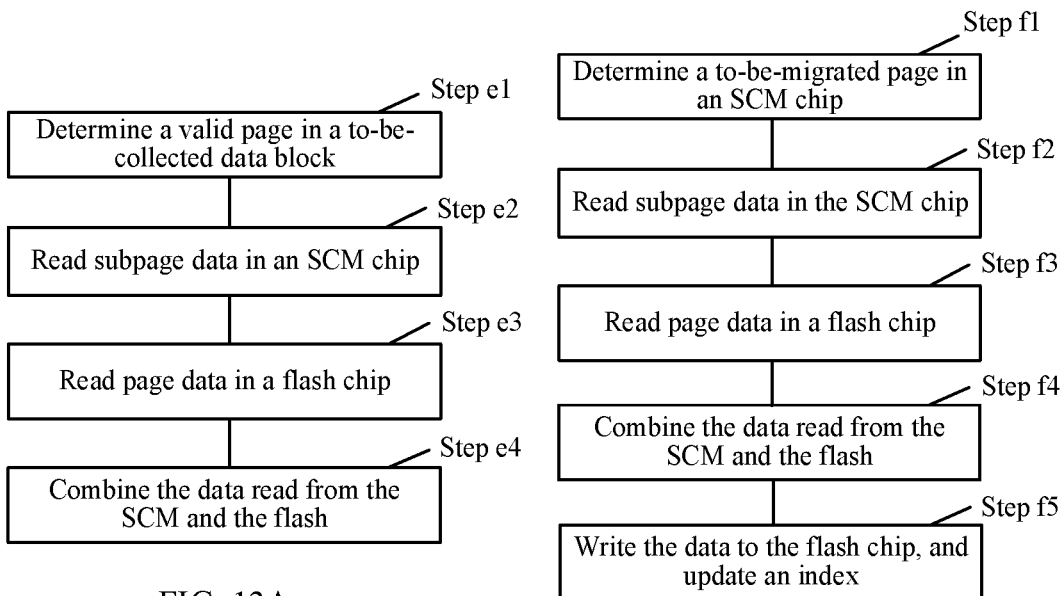
FIG. 13A
Garbage collection
FIG. 13B
Data flow

METHOD FOR WRITING DATA TO SOLID-STATE DRIVE

CROSS-REFERENCE TO RELATED APPLICATIONS

This application is a continuation of International Patent Application No. PCT/CN2022/077686 filed on Feb. 24, 2022, which claims priority to Chinese Patent Application No. 202110662875.8 filed on Jun. 15, 2021, and Chinese Patent Application No. 202110378320.0 filed on Apr. 8, 2021. All of the aforementioned patent applications are hereby incorporated by reference in their entirety.

TECHNICAL FIELD

The present disclosure relates to the field of storage systems, and more specifically, to a method for writing data to a solid-state drive.

BACKGROUND

A solid-state drive (SSD) based on a flash performs a data read/write operation by using a page as a basic unit, and a default page size is usually 4 kilobytes (KB)/8 KB/16 KB. Therefore, a page is widely used as a data write unit in an upper-layer system (for example, a file system and a block system) communicating with the SSD to simplify space management and improve metadata storage efficiency.

When the upper-layer system needs to write data (namely, small input/output (I/O) data) smaller than a page size to the SSD, the upper-layer system usually first reads data that belongs to a same page as the small I/O data from the SSD, then combines the data into new page data, and finally writes the combined page data to the SSD as a new page. It can be learned that executing a write request of small I/O data causes a read operation and a write operation on page data, causing a read/write amplification problem and reducing service life of the SSD.

SUMMARY

In view of this, the present disclosure provides a method and an apparatus/system for writing data to an SSD to improve and optimize a problem of poor write performance of an SSD in a case of small I/O data.

According to a first aspect, an embodiment of the present disclosure provides a method for writing data to an SSD. In the method, two write interfaces are provided: a byte-level write interface and a page-level write interface. A specific writing process of the method includes receiving a first write request through the byte-level write interface, where the first write request carries to-be-written first data, and a length of the first data is less than a size of one flash page; and receiving a second write request through the page-level write interface, where the second write request carries to-be-written second data, and the length of the first data is equal to a size of one flash page.

In the method, both a byte-level write interface and a page-level write interface are provided, while in a conventional SSD, only one flash page can be used as a unit for writing data. The method provides different write interfaces based on a size of written data. When a length of data is less than a size of one flash page, the data can still be written, thereby effectively mitigating a problem of low write performance efficiency in a case of small I/O data.

In a possible design, the first data is written to a storage class memory (SCM) chip of the SSD for persistent storage; and the second data is written to a flash chip of the SSD for persistent storage. In the method, full-page data is written to the flash chip, to achieve high performance and space utilization. In the method, small I/O data is written to an SCM chip to reduce a space waste and eliminate a write amplification problem. In the method, based on a byte-level addressing advantage and a persistence feature of the SCM chip, efficiency of small I/O data write is effectively improved, a write amplification problem caused by small I/O data write is alleviated, and service life of an SSD is effectively prolonged.

In a possible design, the length of the first data is greater than or equal to a minimum management unit of the SCM chip. That the first data is written to a storage class memory SCM chip for persistent storage includes storing the first data at the minimum management unit.

In a possible design, the first write request further carries a logical address of the first data. A physical address at which the first data is written to the SCM chip for persistence is a first physical address. A root page address and a subpage address of the first data are obtained based on the logical address of the first data. An index relationship between the root page address and the subpage address and an index relationship between the subpage address and the first physical address are stored. In the present disclosure, a translation layer of page-level data and byte-level data is established through multi-level index relationship management, thereby effectively improving management efficiency of a storage system.

In a possible design, after the second data is written to a flash chip for persistent storage, when data stored in the SCM chip includes data that is the same as at least some data in the second data, the data that is the same as the at least some data and that is stored in the SCM chip is deleted. In the method, invalid data and an invalid index in the SCM chip are deleted in time, thereby improving use efficiency of the SCM chip.

In a possible design, a page-level read interface is provided. A first read request is received through the page-level read interface to read the second data. The first read request carries a logical address of the second data. It is determined, based on the logical address of the second data, whether the SCM chip has stored third data with a root page address same as that of the second data. When the SCM chip has stored the third data, the third data is read from the SCM chip and the second data is read from the flash chip based on the logical address of the second data. The read third data and second data are combined into full-page data, and the full-page data is returned.

In a possible design, that the third data is read from the SCM chip based on the logical address of the second data includes the root page address of the second data based on the logical address of the second data is obtained; a subpage address of the third data based on the root page address of the second data is obtained; and a physical address of the third data based on the subpage address of the third data is obtained, and the third data based on the physical address of the third data is read.

In a possible design, after the second data is written to a flash chip for persistent storage, the method further includes caching a copy of the second data in a dynamic random-access memory (DRAM) chip of the SSD.

In a possible design, after the first data is written to the SCM chip of the SSD for persistent storage, the method further includes caching a copy of the first data in the DRAM chip.

Optionally, when reading the first data from the SCM chip, it is determined whether a copy of the first data exists in the DRAM chip. If the copy of the first data exists in the DRAM chip, the first data is read from the DRAM chip and returned. If the copy of the first data does not exist in the DRAM chip, the first data is read from the SCM chip.

Optionally, when reading the second data from the flash chip, it is determined whether a copy of the second data exists in the DRAM chip. If the copy of the second data exists in the DRAM chip, the second data is read from the DRAM chip and returned. If the copy of the second data does not exist in the DRAM chip, the second data is read from the flash chip.

In a possible design, the first data and other data are migrated to the flash chip at a granularity of a page. The other data and the first data belong to a same root page, and the other data is located in the SCM chip or the flash chip before the migration.

The first aspect of the embodiment of the present disclosure further provides a data migration method. The method may be applied to an SSD, and the method includes determining a to-be-migrated first root page in an SCM chip, where the SCM chip is located in a flash SSD; reading data corresponding to the first root page from the SCM chip and/or a flash chip, where the flash chip is located in the flash SSD; and combining or directly writing the data corresponding to the first root page to the flash chip.

In a possible design, when the data corresponding to the first root page read from the SCM chip is full-page data, the data corresponding to the first root page is read only from the SCM chip, and written to the flash chip.

In a possible design, when the data corresponding to the first root page read from the SCM chip is not full-page data, the data corresponding to the first root page is separately read from the SCM chip and the flash chip, and is combined and written to the flash chip.

In a possible design, the data corresponding to the first root page in the SCM chip is deleted.

In a possible design, an index corresponding to the first root page is deleted, and a new index is created.

In a possible design, a to-be-migrated root page in the SCM chip is determined based on a page aggregation degree, where the page aggregation degree is a quantity of subpages included in a root page in the SCM chip, and the root page is formed by a plurality of subpages.

In a possible design, a root page with a higher page aggregation degree or a root page with earlier previous update time is preferentially determined as the to-be-migrated root page.

The first aspect of the embodiment of the present disclosure further provides a garbage collection method. The method includes determining a to-be-collected first block in the flash chip, where the first block includes at least a first part of data and a second part of data, the first part of data is located in the SCM chip, the second part of data is located in the flash chip, and the first part of data and the second part of data are valid data; reading the first part of data from the SCM chip, and reading the second part of data from the flash chip; writing the first part of data and the second part of data to a second block in the flash chip; and erasing the first block.

According to a second aspect, an embodiment of the present disclosure provides an SSD, where the SSD includes a master controller, a plurality of flash chips, and one or more SCM chips. The master controller executes computer instructions to perform the method according to any one of the first aspect or the possible designs of the first aspect.

In a possible design, the SCM chip and the flash chip are connected to different channel controllers, where the channel controllers are located in the master controller.

According to a third aspect, an embodiment of the present disclosure provides an apparatus for writing data to an SSD. The apparatus includes a plurality of modules, and the apparatus is configured to implement a function implemented through the method according to any one of the first aspect or the possible designs of the first aspect.

In a possible design, the apparatus includes a byte-level write module and a page-level write module.

The byte-level write module is configured to receive a first write request through a byte-level write interface, where the first write request carries to-be-written first data, and a length of the first data is less than a size of a flash page.

Optionally, the first data is written to an SCM chip of the SSD for persistent storage.

Optionally, after the first data is written to an SCM chip of the SSD for persistent storage, a copy of the first data is cached in a DRAM chip.

The page-level write module is configured to receive a second write request through a page-level write interface, where the second write request carries to-be-written second data, and the length of the first data is equal to a size of one flash page.

Optionally, the second data is written to a flash chip of the SSD for persistent storage.

Optionally, when data stored in the SCM chip includes data that is the same as at least some data in the second data, the data that is the same as the at least some data and that is stored in the SCM chip is deleted.

Optionally, after the first data is written to an SCM chip of the SSD for persistent storage, the page-level write module is further configured to cache a copy of the first data in the DRAM chip.

In a possible design, the apparatus further includes a page-level read module.

The page-level read module is configured to receive a first read request through a page-level read interface to read the second data, where the first read request carries a logical address of the second data; determine, based on the logical address of the second data, whether the SCM chip has stored third data with a root page address same as that of the second data; when the SCM chip has stored the third data, read the third data from the SCM chip and the second data from the flash chip based on the logical address of the second data; and combine the read third data and second data into full-page data and return the full-page data.

Optionally, the reading the third data from the SCM chip based on the logical address of the second data includes obtaining the root page address of the second data based on the logical address of the second data; obtaining a subpage address of the third data based on the root page address of the second data; and obtaining a physical address of the third data based on the subpage address of the third data, and reading the third data based on the physical address of the third data.

Optionally, when reading the first data from the SCM chip, it is determined whether a copy of the first data exists in the DRAM chip. If the copy of the first data exists in the DRAM chip, the first data is read from the DRAM chip and returned. If the copy of the first data does not exist in the DRAM chip, the first data is read from the SCM chip.

Optionally, when reading the second data from the flash chip, it is determined whether a copy of the second data exists in the DRAM chip. If the copy of the second data exists in the DRAM chip, the second data is read from the DRAM chip and returned. If the copy of the second data does not exist in the DRAM chip, the second data is read from the flash chip.

In a possible design, the apparatus further includes a data migration module configured to migrate the first data and other data to the flash chip at a granularity of a page, where the other data and the first data belong to a same root page, and the other data is located in the SCM chip or the flash chip before the migration.

The data migration module is specifically configured to determine a to-be-migrated first root page in an SCM chip, where the SCM chip is located in a flash SSD; read data corresponding to the first root page from the SCM chip and/or the flash chip, where the flash chip is located in the flash SSD; and combine or directly write the data corresponding to the first root page to the flash chip.

Optionally, when the data corresponding to the first root page read from the SCM chip is full-page data, the data corresponding to the first root page is read from the SCM chip, and written to the flash chip.

Optionally, when the data corresponding to the first root page read from the SCM chip is not full-page data, the data corresponding to the first root page is separately read from the SCM chip and the flash chip, and is combined and written to the flash chip.

Optionally, the data corresponding to the first root page in the SCM chip is deleted.

Optionally, an index corresponding to the first root page is deleted, and a new index is created.

Optionally, a to-be-migrated root page in the SCM chip is determined based on a page aggregation degree, where the page aggregation degree is a quantity of subpages included in a root page in the SCM chip, and the root page is formed by a plurality of subpages.

Optionally, a root page with a higher page aggregation degree or a root page with earlier previous update time is preferentially determined as the to-be-migrated root page.

In a possible design, the apparatus further includes a garbage collection module. The garbage collection module is configured to determine a to-be-collected first block in the flash chip, where the first block includes at least a first part of data and a second part of data, the first part of data is located in the SCM chip, the second part of data is located in the flash chip, and the first part of data and the second part of data are valid data; read the first part of data from the SCM chip, and read the second part of data from the flash chip; write the first part of data and the second part of data to a second block in the flash chip; and erase the first block.

In a possible design, the apparatus further includes a translation layer module. The translation layer module is configured to obtain a root page address and a subpage address of the first data based on a logical address of the first data that is further carried in the first write request; and store an index relationship between the root page address and the subpage address and an index relationship between the subpage address and a first physical address, where the first physical address is a physical address at which the first data is written to the SCM chip for persistence.

Optionally, when reading the third data from the SCM chip based on the logical address of the second data, the translation layer module may be configured to: obtain the root page address of the second data based on the logical address of the second data; obtain a subpage address of the third data based on the root page address of the second data; and obtain a physical address of the third data based on the subpage address of the third data, and read the third data based on the physical address of the third data.

According to a fourth aspect, an embodiment of the present disclosure provides a method for writing data to a storage device. The method includes A controller sends a first write request to an SCM storage device. The first write request carries to-be-written first data. A length of the first data is less than a size of one flash page. The SCM storage device receives the first write request through a byte-level write interface. The controller sends a second write request to a flash storage device. The second write request carries to-be-written second data. A length of the second data is equal to a size of one flash page. The flash storage device receives the second write request through a page-level write interface.

Optionally, a write request of one flash page is split into one or more first write operations.

Optionally, different priorities are set for the first write request and the second write request.

In a possible design, the SCM storage device persistently stores the first data, and the flash storage device persistently stores the second data.

In a possible design, the length of the first data is greater than or equal to a minimum management unit of the SCM storage device. That the SCM storage device persistently stores the first data includes storing the first data at the minimum management unit.

In a possible design, the first write request further carries a logical address of the first data. A physical address at which the first data is written to the SCM storage device for persistence is a first physical address. The controller obtains a root page address and a subpage address of the first data based on the logical address of the first data. The controller stores an index relationship between the root page address and the subpage address and an index relationship between the subpage address and the first physical address.

In a possible design, after the flash storage device persistently stores the second data, when data stored in the SCM storage device includes data that is the same as at least some data in the second data, the controller deletes the data that is the same as the at least some data and that is stored in the SCM storage device.

In a possible design method, the controller sends a first read request to read the second data, where the first read request carries a logical address of the second data; determines, based on the logical address of the second data, whether the SCM storage device has stored third data with a root page address same as that of the second data; when the SCM storage device has stored the third data, reads the third data from the SCM storage device and the second data from the flash storage device based on the logical address of the second data; and combines the read third data and second data into full-page data and returns the full-page data.

In a possible design, the reading the third data from the SCM storage device based on the logical address of the second data includes obtaining the root page address of the second data based on the logical address of the second data; obtaining a subpage address of the third data based on the root page address of the second data; and obtaining a physical address of the third data based on the subpage address of the third data, and reading the third data based on the physical address of the third data.

In a possible design, the controller migrates the first data and other data to the flash storage device at a granularity of a page.

The other data and the first data belong to a same root page, and the other data is located in the SCM storage device or the flash storage device before the migration.

According to a fifth aspect, an embodiment of the present disclosure provides a storage system. The storage system includes a controller, an SCM storage device, and a flash storage device. The controller sends a first write request to the SCM storage device. The first write request carries to-be-written first data. A length of the first data is less than a size of one flash page. The SCM storage device receives the first write request through a byte-level write interface. The controller sends a second write request to the flash storage device. The second write request carries to-be-written second data. A length of the second data is equal to a size of one flash page. The flash storage device receives the second write request through a page-level write interface.

Optionally, the controller splits a write request of one flash page into one or more first write operations.

Optionally, the controller sets different priorities for the first write request and the second write request.

In a possible design, the SCM storage device persistently stores the first data, and the flash storage device persistently stores the second data.

In a possible design, the length of the first data is greater than or equal to a minimum management unit of the SCM storage device. That the SCM storage device persistently stores the first data includes storing the first data at the minimum management unit.

In a possible design, the first write request further carries a logical address of the first data. A physical address at which the first data is written to the SCM storage device for persistence is a first physical address. The controller obtains a root page address and a subpage address of the first data based on the logical address of the first data. The controller stores an index relationship between the root page address and the subpage address and an index relationship between the subpage address and the first physical address.

In a possible design, after the flash storage device persistently stores the second data, the controller device is further configured to: when data stored in the SCM storage device includes data that is the same as at least some data in the second data, delete the data that is the same as the at least some data and that is stored in the SCM storage device.

In a possible design method, the controller sends a first read request to read the second data, where the first read request carries a logical address of the second data; determines, based on the logical address of the second data, whether the SCM storage device has stored third data with a root page address same as that of the second data; when the SCM storage device has stored the third data, reads the third data from the SCM storage device and the second data from the flash storage device based on the logical address of the second data; and combines the read third data and second data into full-page data and returns the full-page data.

In a possible design method, the controller is further configured to read the third data from the SCM storage device based on the logical address of the second data, including: obtaining the root page address of the second data based on the logical address of the second data; obtaining a subpage address of the third data based on the root page address of the second data; and obtaining a physical address of the third data based on the subpage address of the third data, and reading the third data based on the physical address of the third data.

In a possible design, the first data and other data are migrated to the flash storage device at a granularity of a page. The other data and the first data belong to a same root page, and the other data is located in the SCM storage device or the flash storage device before the migration.

According to a sixth aspect, an embodiment of the present disclosure provides a computer-readable storage medium. The computer-readable storage medium includes program instructions. When the program instructions are run on a computer or a processor, the computer or the processor is enabled to perform the method according to any one of the first aspect or the possible designs of the first aspect.

The embodiment of the present disclosure further provides a computer-readable storage medium. The computer-readable storage medium includes program instructions. When the program instructions are run on a computer or a processor, the computer or the processor is enabled to perform the method according to any one of the fourth aspect or the possible designs of the fourth aspect performed by a controller.

According to a seventh aspect, the present disclosure provides a computer program product. The computer program product includes instructions, and the instructions are stored in a computer-readable storage medium. A processor of a controller may read the instructions from the computer-readable storage medium. The processor executes the instructions, to enable a storage system or a storage device to implement the method according to the first aspect or various possible designs of the first aspect.

This application provides a computer program product. The computer program product includes instructions, and the instructions are stored in a computer-readable storage medium. A processor of a controller may read the instructions from the computer-readable storage medium. The processor executes the instructions, to enable a storage system or a storage device to implement the method according to the fourth aspect or various possible designs of the fourth aspect.

BRIEF DESCRIPTION OF DRAWINGS

To describe technical solutions in embodiments of the present disclosure more clearly, the following briefly describes the accompanying drawings for describing the embodiments. It is clear that the accompanying drawings in the following descriptions show merely some embodiments of the present disclosure.

FIG. 12 is a schematic flowchart of a page-level read method according to an embodiment of the present disclosure;

FIG. 13A is a flowchart of a garbage collection method according to an embodiment of the present disclosure;

FIG. 13B is a flowchart of a data migration method according to an embodiment of the present disclosure;

DESCRIPTION OF EMBODIMENTS

To make a person skilled in the art better understand the technical solutions in the present disclosure, the following clearly describes the technical solutions in embodiments of the present disclosure with reference to the accompanying drawings in embodiments of the present disclosure. It is clear that the described embodiments are merely a part but not all of embodiments of the present disclosure.

Figure 1:
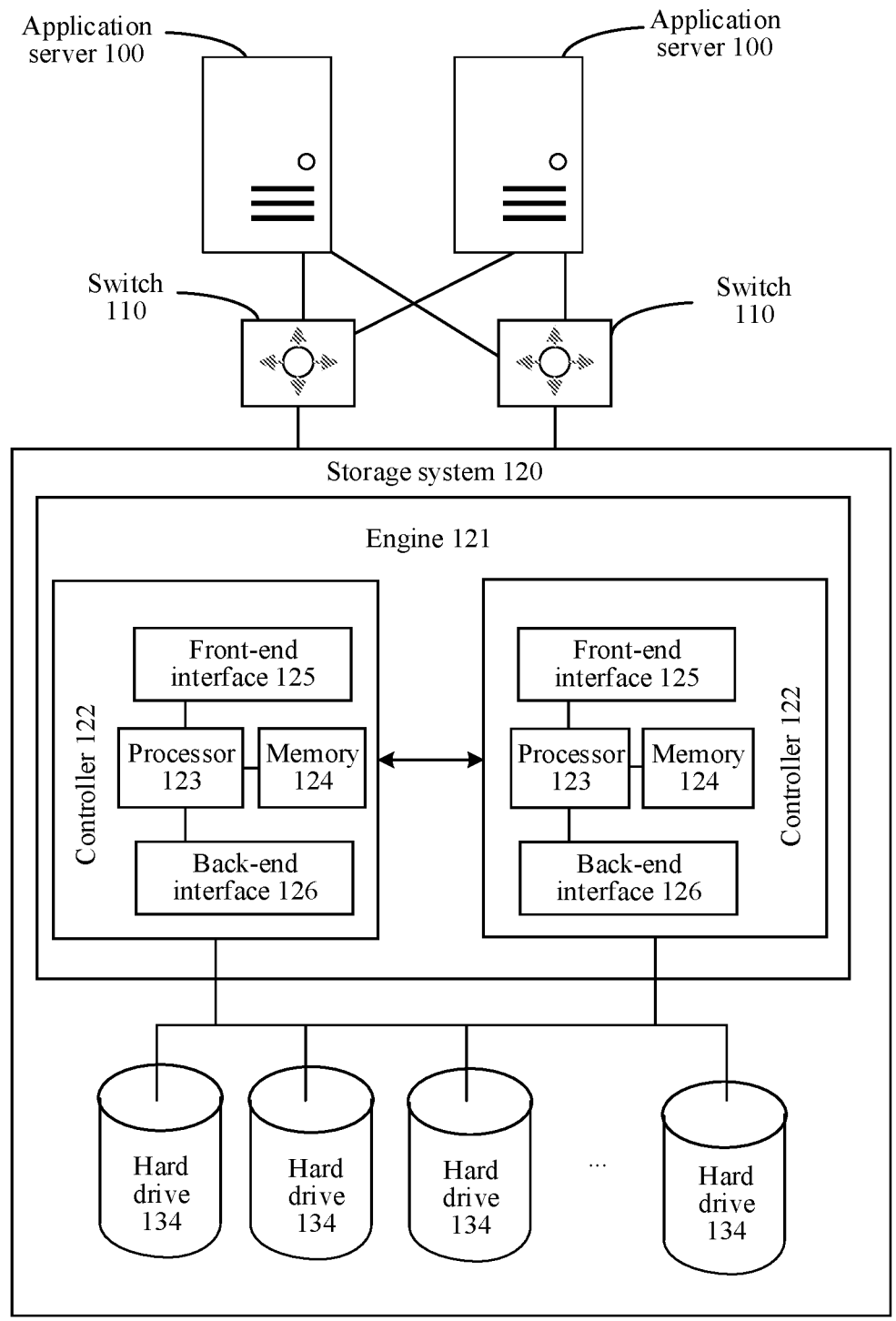
FIG. 1 is an example diagram of a storage network architecture according to an embodiment of the present disclosure.

FIG. 1 is an example diagram of a storage network architecture according to an embodiment of the present disclosure. The storage network architecture includes an application server 100, a switch 110, and a storage system 120 (or a storage node). A method provided in the present disclosure may be applied to the storage network architecture shown in FIG. 1.

The application server 100 may be a physical machine or a virtual machine. The physical machine includes but is not limited to a desktop computer, a server, a laptop, and a mobile device. In an application scenario shown in FIG. 1, a user accesses data through an application running on the application server 100.

The switch 110 is an optional device, and the application server 100 may access the storage system 120 through a fiber channel switch 110 to access data. Alternatively, the application server 100 may directly communicate with the storage system 120 through a network. In addition, the fiber channel switch 110 may be replaced with an Ethernet switch, an InfiniBand switch, a remote direct memory access (RDMA) over Converged Ethernet (RoCE) switch, or the like.

The storage system 120 includes an engine 121 and one or more hard drives 134. The engine 121 is a core component in a centralized storage system, and many advanced functions of the storage system are implemented in the engine 121.

The storage system 120 shown in FIG. 1 is a storage system in which a drive and a controller are integrated. The engine 121 has a drive slot, and the hard drive 134 may be directly deployed in the engine 121. In other words, the hard drive 134 and the engine 121 are deployed on a same device.

The engine 121 includes one or more controllers. Taking two controllers 122 in FIG. 1 as an example, a mirror channel exists between the two controllers, so that the two controllers 122 may back up each other, to avoid unavailability of the entire storage system 120 caused by a hardware fault. The engine 121 further includes a front-end interface 125 and a back-end interface 126, where the front-end interface 125 is configured to communicate with the application server 100, to provide a storage service for the application server 100. The back-end interface 126 is configured to communicate with the hard drive 134, to expand capacity of the storage system.

The controller 122 includes at least a processor 123 and a memory 124. The processor 123 is a central processing unit (CPU), and is configured to process a data access request from outside the storage system (a server or another storage system), and further configured to process a request generated inside the storage system. The memory 124 is an internal memory that directly exchanges data with the processor. The memory 124 includes at least two types of storages. For example, the memory 124 may be a random-access memory (RAM) or a read-only memory (ROM). For example, the RAM is a DRAM, a static RAM (SRAM), or the like. A specific type of the memory 124 is not limited in the present disclosure. Any memory that can be used as the memory 124 to perform exchange with the processor is applicable to embodiments of the present disclosure. The memory 124 stores a software program, and the processor 123 may run the software program in the memory 124 to manage the hard drive. For example, a drive is abstracted into a storage resource pool and then divided into logical unit numbers (LUNs) for a file server to use. These LUNs are drives that can be viewed on an application server. Some centralized storage systems are file servers, and may provide file sharing services for application servers.

The hard drive 134 is configured to provide a storage resource, for example, to store data. Based on a type of a communication protocol between the engine 121 and the hard drive 134, the hard drive 134 may be a serial attached Small Computer System Interface (SCSI) (SAS) hard drive, a non-volatile memory express (NVMe) hard drive, a peripheral component interconnect express (PCIe) hard drive, a serial advanced technology attachment (SATA) hard drive, or another type of hard drive enclosure. In this embodiment of the present disclosure, the hard drive 134 may be a flash SSD. Alternatively, the hard drive 134 may be a magnetic drive or another type of storage medium, for example, an SSD or a shingled magnetic recording hard drive.

Figure 2:
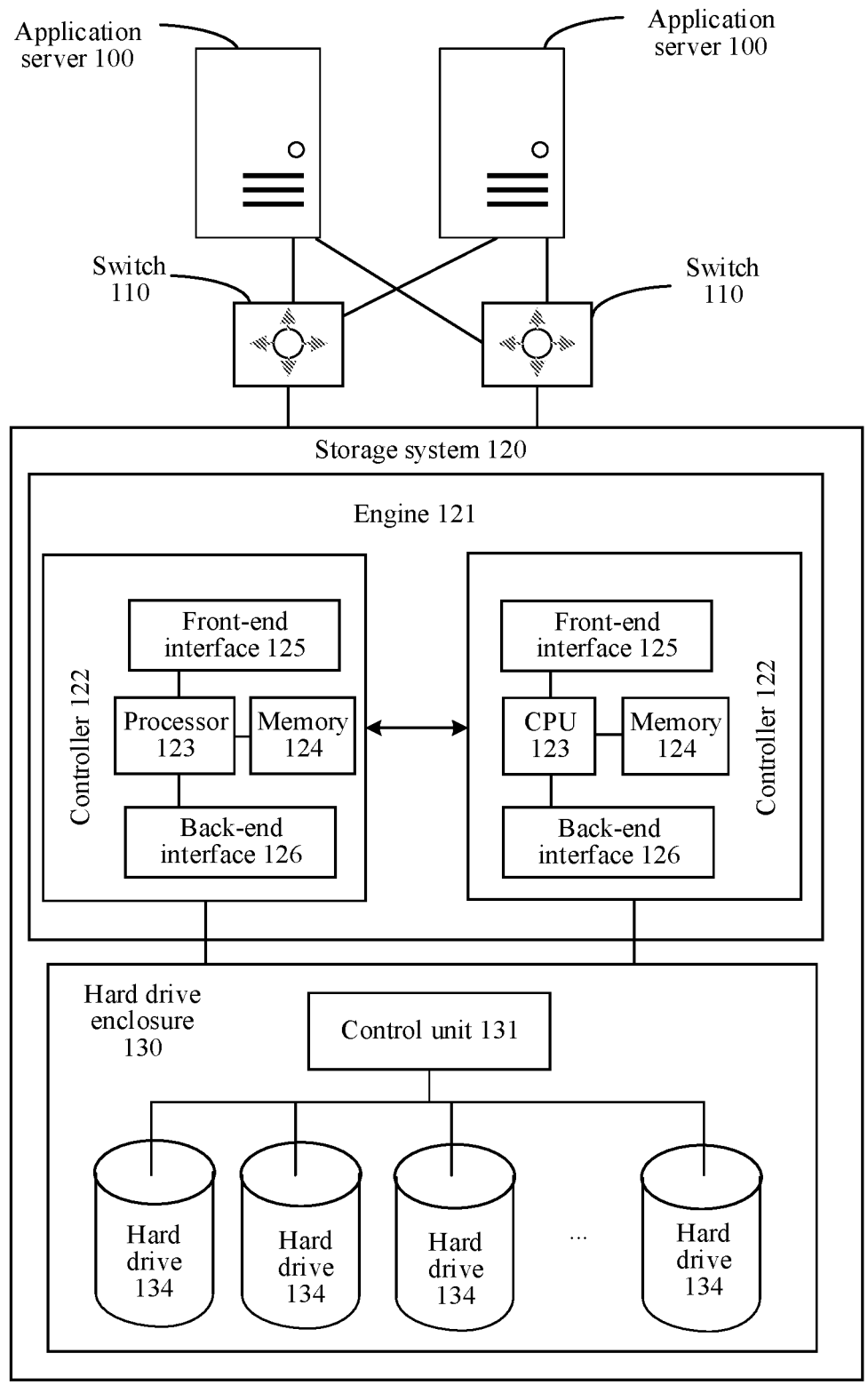
FIG. 2 is an example diagram of another storage network architecture according to an embodiment of the present disclosure.

This application further provides another structure of the storage system 120. As shown in FIG. 2, the storage system 120 may alternatively be a storage system in which a drive and a controller are separated. The engine 121 may not have a drive slot. In other words, the engine 121 and the hard drive 134 are deployed on two devices. In this case, the system 120 further has a hard drive enclosure 130. The hard drive enclosure 130 includes a control unit 131, several hard drives 134, and a network interface card (not shown in the figure). The hard drive enclosure 130 includes a control unit 131 and several hard drives 134. The control unit 131 may have a plurality of forms.

In an implementation, the hard drive enclosure 130 belongs to a smart hard drive enclosure, and the control unit 131 includes a CPU and a memory. The CPU is configured to perform operations, such as address translation and data reading and writing. The network interface card is configured to communicate with another server. In another implementation, a function of the control unit 131 may be offloaded to the network interface card. In other words, in this implementation, the hard drive enclosure 130 may not have the control unit 131, and data reading and writing, address translation, and other computing functions are implemented by the network interface card. In this case, the network interface card is a smart network interface card.

Optionally, in addition to the centralized storage architectures shown in FIG. 1 and FIG. 2, the system 120 may be further applied to distributed storage systems in various forms.

Figure 3:
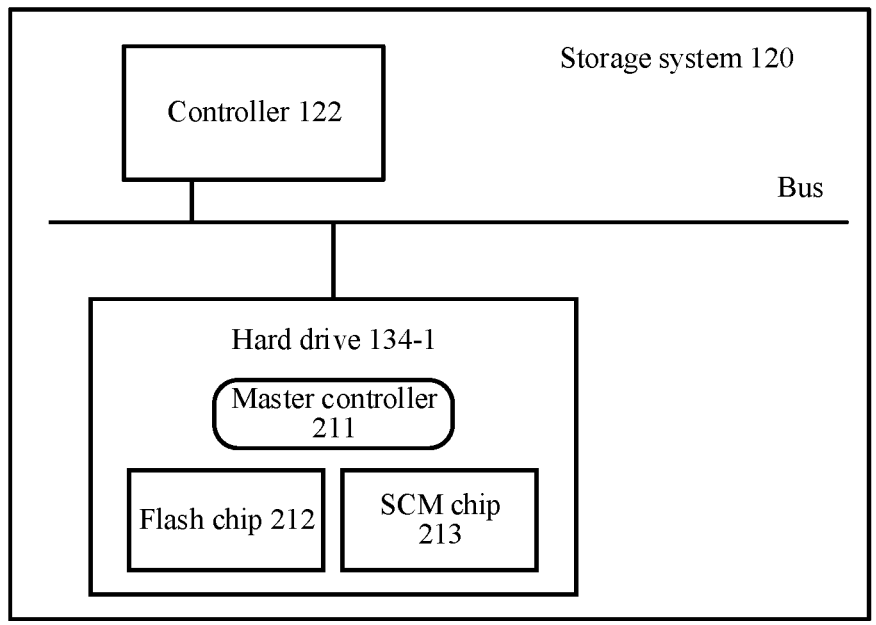
FIG. 3 is a schematic diagram of an internal structure of a storage system according to an embodiment of the present disclosure.

FIG. 3 is a schematic diagram of an internal structure of the storage system 120 shown in FIG. 1 or FIG. 2. As shown in FIG. 2, the storage system 120 includes a hard drive 134-1, and the hard drive 134-1 may be an implementation of the hard drive 134. The storage system 120 includes a hybrid storage medium. To be specific, the hard drive 134 includes two types of storage media: a flash and an SCM. The SCM, also called a persistent memory, is a composite storage technology that combines conventional storage devices and memory features. Therefore, the SCM has features of persistence and fast byte-level access.

In a possible implementation, as shown in FIG. 3, the hard drive 134-1 includes a flash chip 212, an SCM chip 213, and a master controller 211. The SCM chip is connected to the SSD master controller 211 through an independent line. The master controller 211 is an embedded microchip, and includes a processor, a memory, and a communication interface (not shown in FIG. 3). A function of the master controller 211 functions like a command center in that the master controller 211 executes an operation request related to a hard drive. For detailed descriptions, refer to the descriptions in FIG. 4.

The SCM chip 213 is mainly configured for small I/O data (byte-level) write, and the flash chip 212 may be configured for page-level write. Related content of the SCM chip and the flash chip is described in detail in FIG. 5 and FIG. 6 below.

It should be noted that in a storage system, small I/O data refers to a request for data that is less than one full page. Small I/O data write is used as an example. When a full page has a fixed length of 8 KB, write of data less than 8 KB is referred to as small I/O data write. For example, write of data of 64 B, 2 KB, and 4 KB may be referred to as small I/O data write. Similarly, when a full page has a fixed length of 4 KB, write of data less than 4 KB is referred to as small I/O data write. In practice, a size of a full page may alternatively be 16 KB, 32 KB, 64 KB, or the like. A page size is not limited in the present disclosure.

Figure 4:
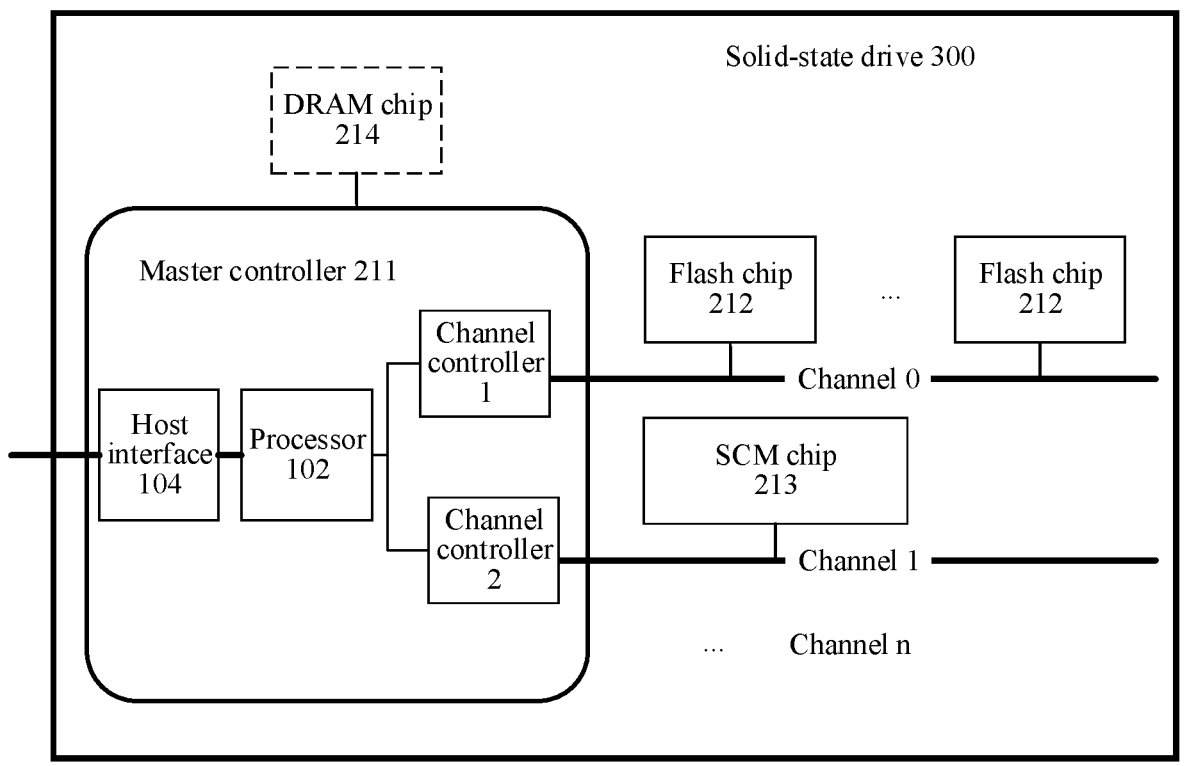
FIG. 4 is a schematic diagram of a structure of an SSD according to an embodiment of the present disclosure.

FIG. 4 is a schematic diagram of a structure of an SSD 300 according to an embodiment of the present disclosure. The SSD 300 may be the hard drive 134-1 in FIG. 3. The SSD 300 is a storage device that mainly uses a flash (for example, a not-and (NAND) flash) and an SCM chip as a permanent memory.

As shown in FIG. 4, the SSD 300 includes a NAND flash 212, a master controller (briefly referred to as a master) 211, and an SCM chip 213. The NAND flash 212 and the SCM chip 213 may be separately configured to persistently write page-level data and byte-level data. The SCM chip 213 may include any other SCM chip that has both byte-level addressing and a persistence feature, such as a phase-change memory (PCM), a non-volatile resistive RAM (ReRAM), a non-volatile magnetic RAM (MRAM), or a Nontero's carbon nanotube RAM (NRAM).

The master 211 is a control center of the SSD, and is responsible for some complex tasks, for example, managing data storage, and maintaining performance and service life of the SSD. The master 211 includes a processor 102, and sends all operation requests of the SSD. For example, functions such as translation layer management, data combination, garbage collection, and data migration mentioned below may also be performed by the master 211. For example, the processor 102 in the master 211 may perform functions such as reading/writing data, garbage collection, and wear leveling through firmware in a buffer. The SSD master 211 further includes a host interface 104 and several channel controllers. The host interface 104 is configured to communicate with a host. The host herein may be a server, a personal computer, or any device such as the controller 122. Through several channel controllers (for example, channel controllers 0 and 1), the master 211 may concurrently operate the flash chip 212 of a channel 0 and the SCM chip 213 of a channel 1, thereby improving bandwidths at the bottom of the chips.

Figure 5:
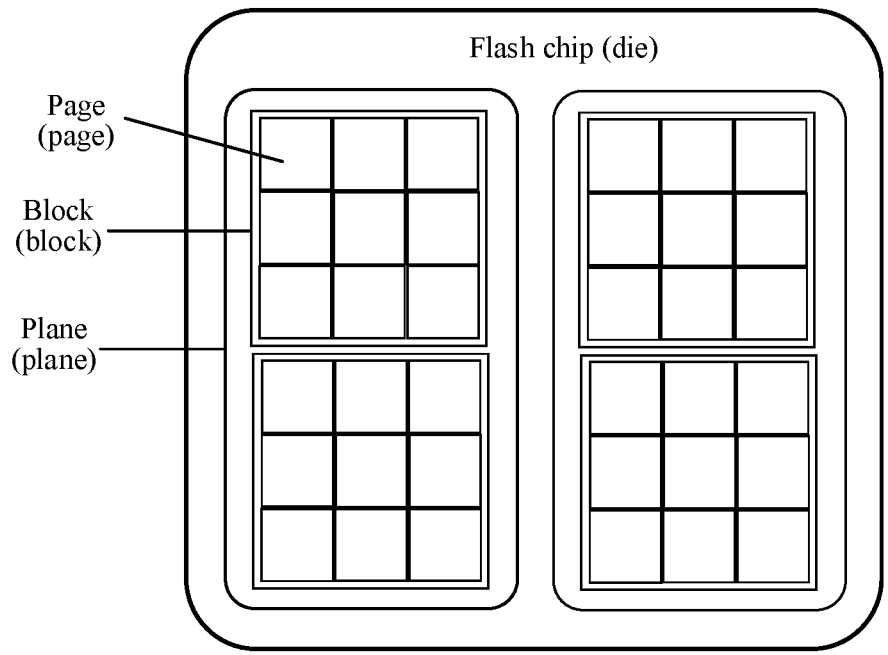
FIG. 5 is a schematic diagram of a structure of a flash chip according to an embodiment of the present disclosure.

FIG. 5 is a schematic diagram of a structure of the flash chip 212 in FIG. 3 or FIG. 4. As shown in FIG. 5, a die is a package of one or more flash chips. One die may include a plurality of planes and a multi-plane NAND is designed to effectively improve performance. As shown in FIG. 5, one die is divided into two planes, and one plane includes a plurality of blocks. One block is formed by several pages.

For example, a flash chip has capacity of 16 GB. One page is logically formed by every 4314*8=34512 cells. Each page may store 4 KB content and 218 byte (B) error correction code (ECC) data. A page is also a minimum unit of an I/O operation. One block is formed by every 128 pages, and one plane is formed by every 2048 blocks. An entire flash chip is formed by two planes, and the two planes may be concurrently operated. This is merely an example. A size of a page, capacity of a block, and capacity of a flash chip may have different specifications. This is not limited in this embodiment.

A page is a minimum unit for writing data in a flash chip. In other words, the master 211 writes data to a block at a granularity of a page. Similarly, a page is also a minimum unit for reading data in a flash chip.

When a block is fully written, the master 211 of the SSD selects a next block to continue writing. A block is a minimum unit for data erasing and garbage collection. When erasing data, the master 211 will erase an entire block.

Figure 6:
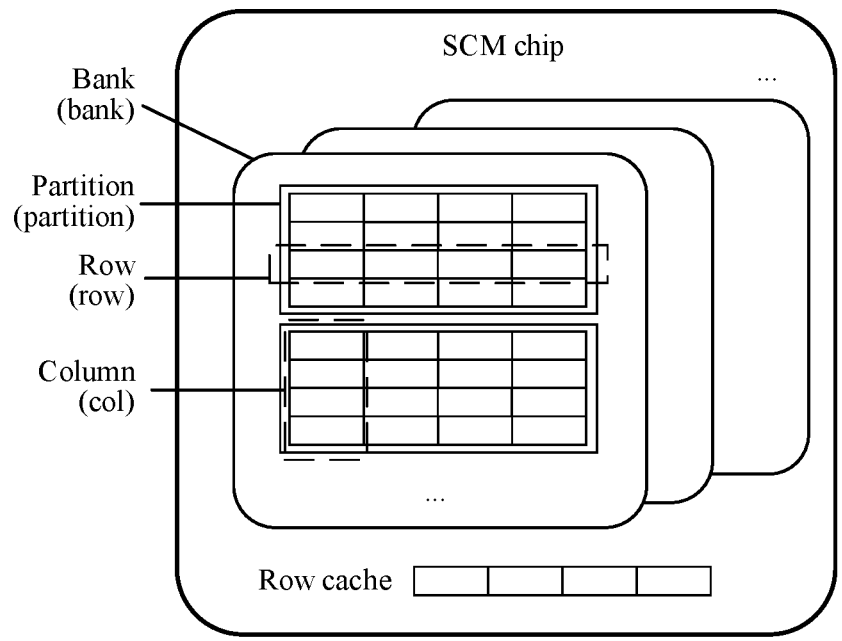
FIG. 6 is a schematic diagram of a structure of an SCM chip according to an embodiment of the present disclosure.

FIG. 6 is a schematic diagram of a structure of the SCM chip 213 shown in FIG. 3 or FIG. 4. As shown in FIG. 6, the SCM chip 213 includes a plurality of banks, and a bank is a component configured to store data in a chip. For example, if an SCM chip with capacity of 32 gigabytes (GB) includes 32 banks, each bank has capacity of 1 GB. Optionally, a bank is further divided into a plurality of partitions, and concurrency is provided between a plurality of partitions in a same bank.

In a bank, stored data is managed in a manner of row and column (col) to implement a byte-level addressing function. A storage unit (for example, a phase-change storage unit or a floating-gate transistor) may be determined at an intersection of each word line and each bit line, where the word line and the bit line are two data lines perpendicular to each other and are configured to connect a plurality of storage units. In a bank, one word line connects to a plurality of storage units in a row. A plurality of storage units in a specific row may be selected by applying a level value different from that of another word line to a selected word line to perform operations such as data reading and writing. In practice, the SCM chip 213 may further include modules (not shown in FIG. 6), for example, a row decoder, a column decoder, a command compiler, a drive circuit, and a digital controller.

In addition, the SCM chip in FIG. 6 further includes a "row cache" module configured to cache data of a row mentioned above. It can be learned that the SCM chip 213 may perform reading and writing based on a length of a row. In other words, a row may be used as a minimum management unit of the SCM chip.

For example, a size of a row in the SCM chip is 64 bytes. After receiving a read command from the controller 211, the SCM chip first reads 64-byte data from a row in a bank to a row cache, and then sends the 64-byte data from the row cache to the controller 211. Similarly, the written 64-byte data needs to be first written from the controller 211 back to a specified row cache, and then is written to a row in the bank. In addition, a size of a cache line is not limited in this embodiment.

In a possible implementation, data in a "subpage" in the following embodiments of the present disclosure may be data in a row in an SCM herein. Generally, a size of a row is far less than a size of a "page" in the flash chip 212. In other words, "subpage" data is data less than that of a "page". Therefore, one page may be formed by a plurality of subpages. For example, an 8 KB page may include 128 64-byte subpages.

Generally, a flash translation layer (FTL) module exists in a flash SSD, and is configured to implement translation between a logical address (LBA) of a host and a physical address (Physical Block Address (PBA)) in a flash memory. For example, when reading data, a flash chip reads the data in pages. For example, the master controller 211 may find a physical address in the flash chip based on a logical address of a page sent by the controller 211, and read required data from the flash. In a possible implementation, the FTL may be implemented through a hash table.

However, the solution provided in the present disclosure relates to reading/writing data at two granularities, namely, page-level data and byte-level data, in a flash chip and an SCM chip. Therefore, translation layers of the page-level data and the byte-level data further need to be established, to manage the page-level data and byte-level data. In this way, management efficiency of a storage system is improved.

Figure 7:
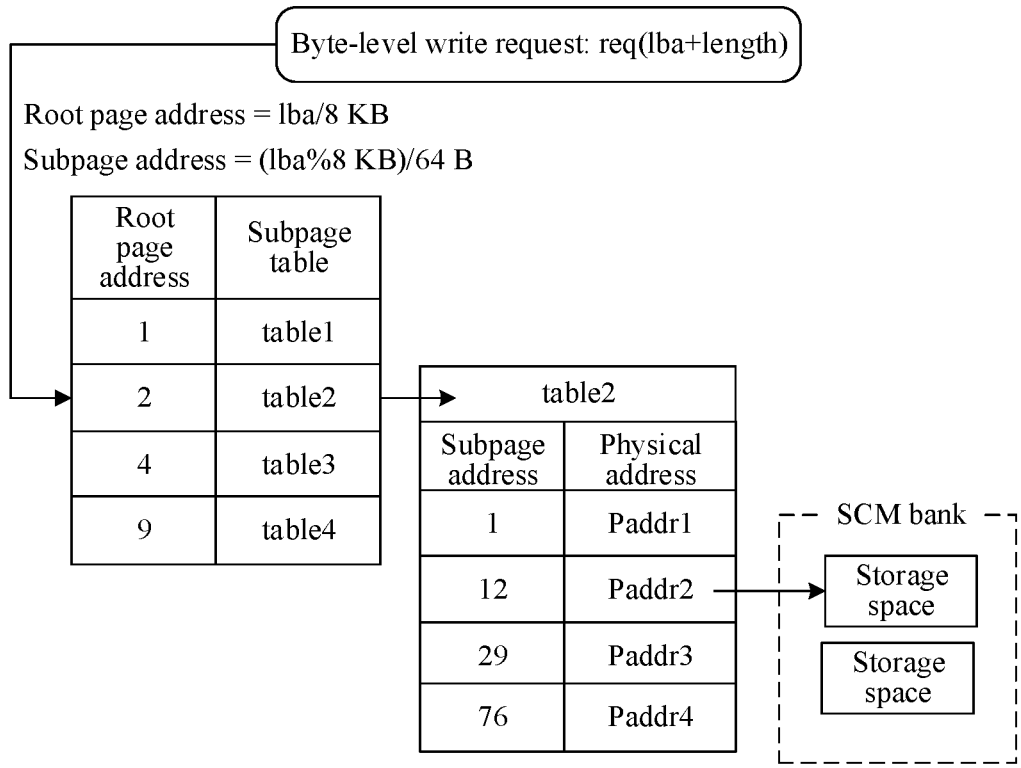
FIG. 7 is a schematic diagram of a software solution of translation layers of two levels according to an embodiment of the present disclosure.

For the foregoing problem, FIG. 7 is a schematic diagram of a software solution of translation layers of two levels according to the present disclosure. The byte-level data written to the SCM chip is abstracted into a concept of "subpage" for management, and the translation layer may be applied to the system 120 in embodiments of the present disclosure. In a possible implementation, the foregoing method for the translation layers of two levels is performed in an SSD master controller (for example, the master controller 211).

For example, the translation layers of two levels in FIG. 7 include indexes of two levels: (1) finding a corresponding root page based on a root page address; and (2) finding a physical address corresponding to subpage data in a subpage table of the root page based on a subpage address. In this way, the corresponding data may be accessed from the SCM chip based on the physical address. Details are as follows:

First, as shown in FIG. 7, the master 211 receives a byte-level write request req, where the request carries to-be-written data, a logical address (lba) of the to-be-written data, and a length of the data. Assuming that a size of a flash page in the hard drive 134-1 is 8 KB and the length of the data in the request req is 64 bytes, the controller 211 may obtain a corresponding root page address and a corresponding subpage address based on the logical address in the request.

For example, the root page address=lba/8 KB, the subpage address=(lba % 8 KB)/64 B.

Then, a page-level index table (first from left) in FIG. 6 is queried based on the root page address (lba/8 KB). If the root page address exists in the page-level index table, it indicates that the SCM stores data of a page, and a subpage table corresponding to the page may be obtained. For example, when lab/8 KB=2, a subpage table table2 corresponding to a root page 2 in the page-level index table may be found.

Then, the subpage table table2 is queried based on the subpage address (lba % 8 KB)/64 B. If the subpage address exists in the table2, it indicates that the SCM stores data of a subpage. For example, when (lba % 8 KB)/64 B=12, it may be found that a subpage 12 corresponds to a physical address Paddr2 If no corresponding subpage address is found in the table2, it indicates that there is no valid data of the subpage in the SCM chip, and a new subpage is inserted into the subpage table of the root page. For example, an entry of a <subpage address, physical address> mapping is added to the end of the table2.

Finally, SCM storage space pointed to by the Paddr2 is accessed based on the physical address. For example, the to-be-written data carried in the req is written to the storage space.

In a possible implementation, the indexes of two levels in the translation layers of two levels are stored in isolated storage space in the SCM chip.

In an optional implementation, the foregoing method for the translation layers of two levels may alternatively be performed by a processor (for example, the controller 122 in a control enclosure) in an upper-layer system of an SSD. A specific method is similar to that performed by the master controller 211.

Based on the foregoing content, the present disclosure further provides a method for writing data to an SSD. In the method, both a byte-level write interface and a page-level write interface are provided, to resolve a problem of low write performance efficiency in a case of small I/O data. Specifically, in the method embodiment, full-page I/O data is written to a flash chip through a conventional page-level interface, to achieve high performance and space utilization. Small I/O data is written to an SCM chip through a byte-level interface, to reduce a space waste and eliminate write amplification. Based on a byte-level addressing advantage and a persistence feature of the SCM chip, efficiency of small I/O data write is effectively improved, a write amplification problem caused by small I/O data write is alleviated, and service life of an SSD is effectively prolonged. For two system architectures proposed in FIG. 2 and FIG. 3, the present disclosure provides two embodiments to further describe the method proposed in the present disclosure.

Embodiment 1

Figure 8:
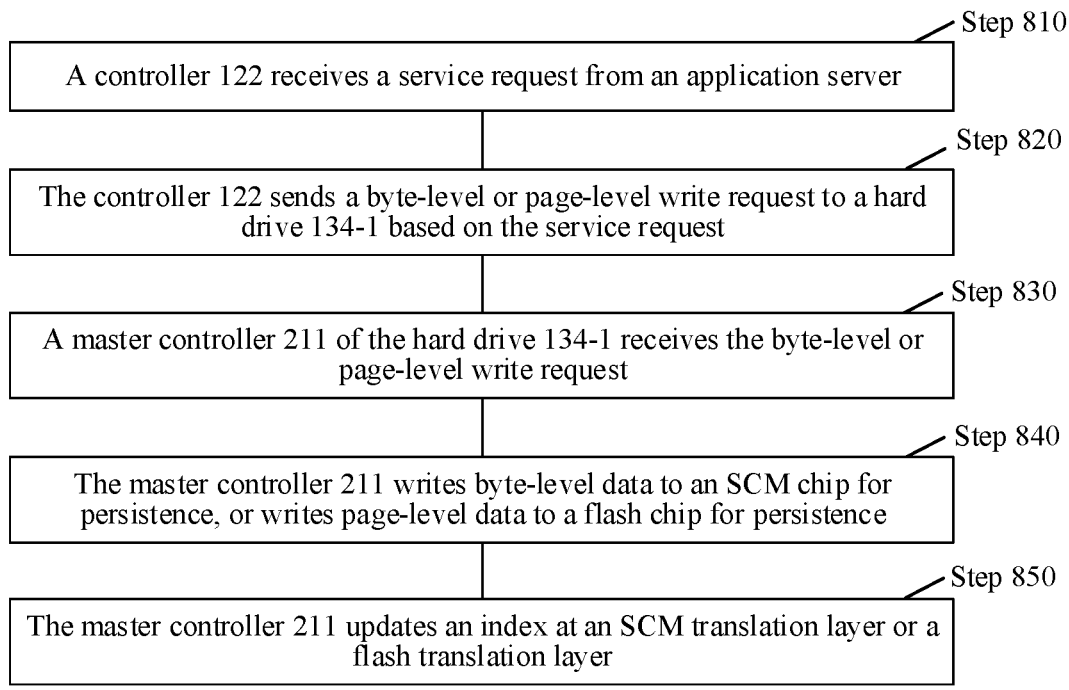
FIG. 8 is a schematic flowchart of a method for writing data to an SSD according to an embodiment of the present disclosure.

Based on the storage system 120 in FIG. 3, this embodiment provides a method for writing data to an SSD. FIG. 8 is a schematic flowchart of a method for writing data to an SSD according to Embodiment 1. In the method embodiment, an SCM chip is located inside a flash SSD (the hard drive 134-1). In a possible implementation, an SCM is used as a persistent cache and is transparent to software in the controller 122, in other words, the software in the controller 122 only can see available space of a flash chip. Based on a read/write request sent by the software in the controller 122, data is written to a flash chip or the SCM chip in the hard drive 134-1 through a byte-level write interface and a page-level write interface provided by a driver software of the SSD. In addition, a garbage collection operation of the flash and a data migration operation of the SCM in Embodiment 1 may be performed by the master controller 211 of the hard drive 134-1, and do not consume CPU resources of the controller 122. For detailed descriptions, refer to the following description.

Steps in FIG. 8 are as follows:

Step 810: The controller 122 receives a service request from an application server.

The controller 122 in the storage system 120 receives a service request sent from outside the storage system (the application server 100 or another storage system), where the service request may be for accessing data stored in the storage system. Optionally, the controller 122 may alternatively receive a request generated by an internal application of the storage system.

Step 820: The controller 122 sends a byte-level or page-level write request to the hard drive 134-1 based on the service request.

After the controller 122 receives an access request, the processor 123 of the controller 122 sends the byte-level or page-level data request to the drive 134-1 through two interfaces provided by a driver layer (driver software) of the hard drive 134-1.

In a possible implementation, before sending the data request to the hard drive 134-1, the processor 123 invokes a file system in a system kernel, and the file system determines whether to initiate a byte-level request or a page-level request. Then, scheduling optimization is performed on the two types of requests through an I/O scheduler in the system kernel. Finally, the two types of requests are sent to the hard drive 134-1 through a byte-level interface and a page-level interface provided by the driver software.

The following provides specific examples for decision-making of the file system and I/O scheduling involved in this section.

(1) Decision-Making of the File System

A software stack used by an existing file/block system is evicted to an SSD memory based on a memory page (4 KB or 8 KB), and a byte-level interface cannot be used. For a small I/O data write scenario in this embodiment of the present disclosure, the present disclosure further provides an adaptation solution of a file system. For example, the file/block system may determine whether to split an 8 KB page into one or more 64 B write operations, and write the write operations to the master controller 211 through a device driver.

Considering that a minimum access unit of a DRAM memory (for example, the memory 124 in FIG. 1) is a cache line, a file/block system of the controller 122 manages a memory unit at a granularity of a page, and the cache line (for example, a size of 64 B), similar to a data management unit in an SCM chip, is less than a size of one page. In a possible implementation, the file system may determine, based on to-be-modified cache line data (namely, a quantity of subpages), whether to use byte write or page write. Because SCM space in a hybrid SSD (for example, the hard drive 134-1) is limited, caching more subpages can bring higher benefits. Details are as follows:

The controller 122 adds a 1-bit flag to each piece of subpage data (whose size is the same as a size of a cache line) in a memory page, to record whether each cache line in the page is modified, and a modified cache line is marked as a dirty subpage. When a dirty memory page is flushed to the hard drive 134-1, the file system may deliver a plurality of 64 B small I/O data write requests to adapt to a byte-level write interface of the hard drive 134-1, and write dirty subpage data to the SCM chip. Clean subpage data is consistent with the data in the flash chip, and does not need to be written.

For example, in an optional implementation, when a total quantity of dirty subpages in the dirty memory page is less than a threshold (for example, 4 KB), the byte-level write interface is invoked to deliver a plurality of byte-level write requests, and a plurality of pieces of dirty subpage data is written to the SCM chip. Alternatively, when the total quantity of dirty subpages is greater than the threshold, a page-level write interface (for example, 8 KB) is used to deliver a page-level write request, to write the dirty memory page to the flash chip.

(2) I/O Scheduling

This embodiment of the present disclosure further provides a method for preferentially scheduling small I/O data write, and the method may be performed by a processor of the controller 122. For example, after the file/block system delivers the page-level write request and the byte-level write request, the I/O scheduler in the system kernel may further set a higher priority for the byte-level write request (small I/O data write), to improve write performance of the small I/O data write. Because small I/O data write has a lower write delay, if a higher priority is allocated to a 64 B small I/O data write queue in I/O scheduling, processing performance of small I/O data is improved, and an I/O queuing delay is reduced. In a scenario in which big I/O data and small I/O data coexist, the hybrid SSD provided in this embodiment of the present disclosure may achieve better I/O operations per second (IOPS) performance.

Step 830: The master controller 211 of the hard drive 134-1 receives the byte-level or page-level write request.

The master controller 211 receives a write request sent by the controller 122, where the write request carries a start address of to-be-written data, a length of the data, and the to-be-written data. A person skilled in the art generally refers to a start address as a logical block address (LBA), which is briefly referred to as a logical address in embodiments of the present disclosure. The controller 122 may access a corresponding PBA in the hard drive through the logical block address LBA to read and write data.

For the page-level write request, the length of the data carried in the request is equal to a size of a full page in a flash chip.

For the byte-level write request, the length of the data carried in the request is less than a size of a full page in a flash chip. In a possible implementation, the length of the data is a length of a minimum management unit in the SCM chip, for example, 64 B. In this case, the controller 122 may implement splitting of the write request. For example, the file system may split page write, and deliver one or more byte-level write operations.

Optionally, the length of the data may alternatively be a multiple of a size of a minimum management unit in the SCM chip, for example, 128 B or 512 B. In this case, the master controller 211 may split the data into a plurality of minimum management units and write the plurality of minimum management units to the SCM chip.

Step 840: The master controller 211 writes byte-level data to the SCM chip for persistence, or writes page-level data to the flash chip for persistence.

For a write request, after receiving the write request sent by the controller 122, the master controller 211 of the SSD hard drive writes the data to an SCM memory or a flash memory based on different write requests, and updates indexes of the flash and the SCM. In a possible implementation, the master controller 211 determines, based on a length of arrived data, whether the data is written to the SCM chip or the flash chip. To be specific, small I/O data is written to the SCM chip, and big I/O data is written to the flash chip. In an optional implementation, the SSD master controller may alternatively directly determine, based on a type of a write interface of the controller 122, whether the data is written to the SCM chip or the flash chip.

Step 850: The master controller 211 updates an index at an SCM translation layer or a flash translation layer.

In this embodiment of the present disclosure, an index in the SCM chip is managed at a granularity of a "subpage" (for example, 64 bytes), and the translation layers of two levels in FIG. 7 are used. To be specific, a root page is first found based on the logical address, and then all subpage addresses may be found in the root page. Each subpage address corresponds to a physical address in the SCM memory. A size of data stored in the physical address PBA may be a size of a cache line in the SCM chip. For specific content, refer to the foregoing related descriptions.

In a possible implementation, the page-level index table in FIG. 7 may be implemented in a structure of a hash table. The hash table includes a page address (key) and a subpage table (value). Searching for a subpage table in the hash table is implemented through a radix tree or a red-black tree.

In this embodiment of the present disclosure, the flash chip is managed at a granularity of a page (for example, 8 KB), and a conventional page-level/block-level/block-page hybrid management algorithm may be used. For example, a mapping from an LBA to a PBA (namely, an FTL) is also recorded in the hard drive 134, and the master controller 211 may find page data at the corresponding PBA in the flash chip based on the LBA.

To further describe the write operation in Embodiment 1 of the present disclosure, a specific example is provided below.

A. Byte-Level Write

Figure 10A:
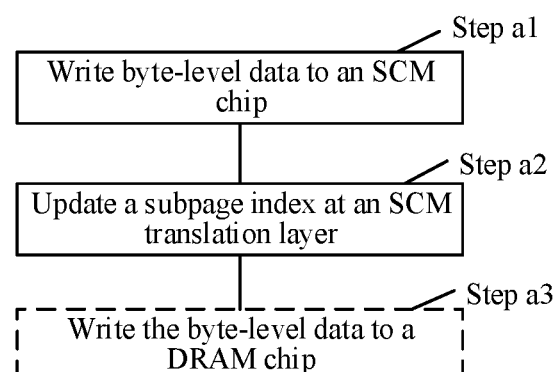
FIG. 10A is a schematic flowchart of a byte-level write method according to an embodiment of the present disclosure.

The hard drive 134 provides a byte-level write interface. When the master controller 211 receives a byte-level write request (for example, 64 B), the master controller 211 first identifies that a length of data in the request is less than one page, and determines that the data should be written to the SCM. It is assumed that the master controller 211 finds, based on the translation layers of two levels in FIG. 7, a root page and an index of a subpage that correspond to the 64 B subpage data. Then, the master controller 211 queries whether there is remaining storage capacity in the SCM chip 213. If the storage capacity is already full, a data migration (TierDown) operation needs to be first performed to ensure that there is sufficient space for writing in the SCM. The data migration operation essentially refers to migrating data in an SCM chip to a flash chip or migrating data in a flash to an SCM chip. For details, refer to the following descriptions. FIG. 10A is a schematic flowchart of a byte-level write method according to the present disclosure. Details are as follows:

Step a1: Write the byte-level data to an SCM chip.

The 64-byte subpage data is written to the SCM chip (the SCM chip 213) for persistence, and a physical address at which the subpage data is written to the SCM chip for persistence is recorded as PA1.

Step a2: Update an index at an SCM translation layer.

Refer to FIG. 7. A root page address and a subpage address are obtained based on the logical address. The hash table (namely, the page-level index table) at the translation layers of two levels of the SCM is queried to determine whether the root page exists and whether the subpage exists in the root page. If the root page is not found, it indicates that the data is newly written subpage data, and entries of corresponding root page address and subpage address need to be added to the hash table, where the entry of subpage address <offset, paddr> includes a subpage address (offset) and an SCM physical storage space address (paddr). If the root page is found, paddr in a subpage table in the hash table is modified based on a root page address of a corresponding 8 KB page address, so that the paddr points to an SCM address PA1 of the newly written 64 B data. For specific descriptions, refer to the foregoing related descriptions.

It can be learned that in the entire 64-byte write and index update steps, page data and the index in the flash chip 212 may not be modified.

Step a3: Optionally, write the byte-level data to a DRAM chip for caching.

Figure 9:
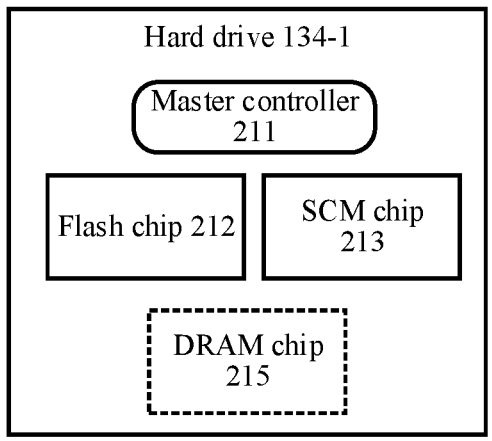
FIG. 9 is a schematic diagram of a structure of a hard drive according to an embodiment of the present disclosure.

Optionally, FIG. 9 is a schematic diagram of another structure of the hard drive 134-1 according to Embodiment 1 of the present disclosure. The hard drive 134-1 further includes a DRAM chip 215. The chip 215 may be configured to cache data. After the subpage data is written to the SCM in the foregoing step, the master controller 211 checks whether the 8 KB page in which the subpage is located exists in the DRAM chip 215. If the 8 KB page exists in the DRAM chip 215, the subpage data is updated to the DRAM chip 215 as a copy to support subsequent reading, thereby improving data reading efficiency of the hard drive. If the 8 KB page does not exist in the DRAM chip 215, DRAM data is not updated.

Embodiment 1 of the present disclosure further provides a method for a page-level write operation. The method may be applied to the system 120 in FIG. 3. A specific example is provided below.

B. Page-Level Write

Figure 10B:
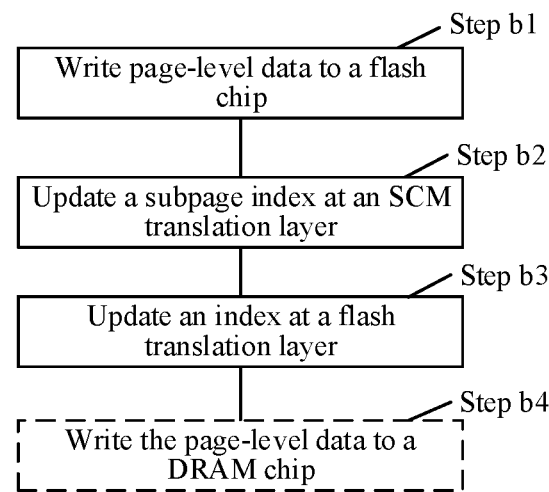
FIG. 10B is a schematic flowchart of a page-level write method according to an embodiment of the present disclosure.

The hard drive 134 provides a page-level write interface. When the master controller 211 receives a page-level write request (for example, 8 KB), the master controller 211 first identifies that a length of data in the request is equal to one page, and determines that the request should be written to the flash chip. FIG. 10B is a schematic flowchart of a page-level write method according to an embodiment of the present disclosure. The following steps are performed.

Step b1: Write the page-level data to a flash chip.

First, 8 KB data is written to a newly allocated idle page of a flash memory, and a written physical address is PA2. After it is determined that the data writing succeeds, the following steps are performed. If the writing fails, a write failure is directly returned to the controller 122, and no subsequent step is performed.

Step b2: Update an index at an SCM translation layer.

The hash table of the SCM index is queried to determine whether a root page corresponding to the 8 KB page address exists. If the root page exists, indexes and data of all subpages in the root page need to be deleted, to ensure that all 64 B subpage data in the 8 KB page cannot be read in the SCM. After the subpage data is deleted from the SCM index, corresponding space is collected to support subsequent small I/O data write. If the root page does not exist, no operation needs to be performed on the translation layers of two levels of the SCM, and a next step is directly entered.

Step b3: Update an index at a flash translation layer.

After it is determined that the foregoing two steps are successful, an index corresponding to the page at the flash translation layer is updated. To be specific, the physical address PBA pointed to by the logical address of the page is changed to PA2, and a message indicating that the data is successfully written to the page is returned upwards.

Step b4: Optionally, write the page-level data to a DRAM chip.

After the data is written to the flash in the foregoing steps, the master controller 211 may further write the 8 KB page data to the DRAM chip 215 as a copy for caching, to support subsequent reading.

Embodiment 1 of the present disclosure further provides a method for a page-level read operation. The method may be applied to the system 120 in FIG. 3. A specific example is provided below.

C. Page-Level Read

The hard drive 134 may further provide a page-level read interface. The master controller 211 receives a page-level read request (for example, 8 KB). After identifying that a length of data in the request is equal to one page, the master controller 211 initiates a corresponding read operation, and the master controller 211 reads data from the SCM and the flash.

Figure 11:
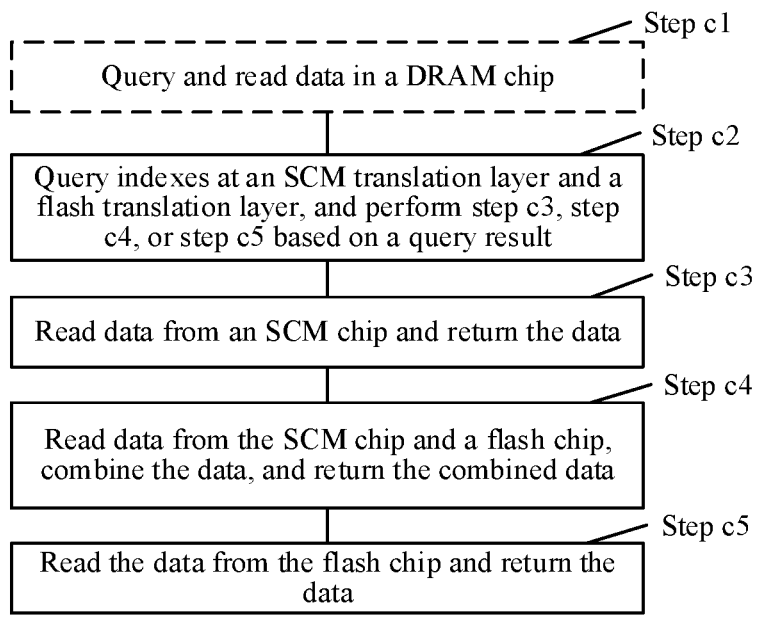
FIG. 11 is a schematic flowchart of a page-level read method according to an embodiment of the present disclosure.

FIG. 11 is a schematic flowchart of a page-level read method according to the present disclosure. Specific steps are as follows:

Step c1: Optionally, query and read data in a DRAM chip.

In a possible implementation, after data is written to an SCM and a flash, when a copy of the data is updated to a DRAM (as described in step a3 and step b4), the data may have been cached in the DRAM chip 215 during reading. In other words, the DRAM chip is used as a read cache of both the SCM and the flash.

Optionally, when reading data, the master controller 211 may first query whether to-be-read page data exists in the DRAM chip 215. If the data exists, a cached copy of the data is directly read from the DRAM chip, and a response indicating that the reading succeeds is returned, without performing subsequent steps, thereby effectively improving reading efficiency. If the data does not exist, a next step is entered.

Step c2: Query whether the data exists in an SCM chip and a flash chip, and perform step c3, step c4, or step c5 based on a query result.

Specifically, the SCM translation layer and the flash translation layer are queried to determine whether an index of the 8 KB page address exists. In other words, a corresponding page address is queried in the hash table based on the logical address. According to existence of a page address in the page-level index table, the master controller 211 sequentially performs the following steps: performing step c3 when it is found, in the SCM, that all (subpage) indexes corresponding to the page may point to a complete page; or performing step c4 when a corresponding page index is found in both the SCM and the flash; or performing step c5 when a corresponding root page node is not found in the SCM, and an index address of the page is found in the flash; or returning a read failure message when a corresponding page index is not found in the SCM and the flash.

Step c3: Read the data from the SCM chip and return the data.

The master controller 211 queries an index of a 64 B subpage corresponding to the 8 KB page node, and reads subpage data stored in the SCM based on the index. Because all subpages in the SCM chip can be combined into a full 8 KB page, after an SCM read request is executed, full-page data is returned to the controller 122 without waiting for a flash read request. After a flash read operation is completed, the data may be directly discarded. This scenario may occur when a user writes data less than an 8 KB page a plurality of times and no garbage collection or data migration is triggered.

Step c4: Read the data from the SCM chip and the flash chip, combine the data, and return the combined data.

The controller 211 reads data from indexes of the SCM and the flash at the same time. After it is determined that data is successfully read from the two media, a combination operation needs to be performed on the two pieces of data. For example, in an implementation, after 64 B subpages corresponding to an address of an 8 KB page in an SCM are traversed, it is found that subpages 1 to 3 in the 8 KB page are stored in the SCM. In this case, data in the subpages 1 to 3 replaces data corresponding to corresponding locations 0 to 2 in the 8 KB page that is read from an SSD (specifically, an 8 KB page in a flash has a total of 192 subpages that equal 8 KB/64 B, and one flash page may store 192 pieces of SCM subpage data). The read data is combined into full 8 KB page data, and the combined data is returned to the controller 122. This scenario occurs when a user has written data less than 8 KB and no GC/TierDown is triggered.

Step c5: Read the data from the flash chip and return the data.

The master controller 211 does not read any data from the SCM memory, but directly reads 8 KB page data from the flash and returns the 8 KB page data to the controller 122. This scenario occurs when a user has never written data less than 8 KB or garbage collection or data migration (Tier-Down) has been triggered.

FIG. 12 is a schematic flowchart of another page-level read method according to the present disclosure. A difference from FIG. 11 lies in that a prerequisite of the method in FIG. 11 is that copies of data written to an SCM and a flash need to be written to a DRAM chip (in other words, step a3 and step b4 are performed). However, a prerequisite of the method in FIG. 12 is that only a copy of data written to a flash is written to a DRAM chip (in other words, step b4 is performed), and after the data is persisted in an SCM, the data is not written to a DRAM (step a3 is not performed).

In other words, the DRAM chip in FIG. 11 is used as a read cache of the flash and the SCM, and the DRAM chip in FIG. 12 is used only as a read cache of the flash. Therefore, in the method in FIG. 12, when reading data in the SCM, data cached in the DRAM does not need to be read first. Specific steps in FIG. 12 are as follows:

Step c1': Read data from an SCM chip, and if the data is full-page data, return the data. The master controller 211 reads all 64 B subpages of a found page node, and reads subpage data stored in the SCM based on indexes. If the read data can be combined into a full 8 KB page, the full-page data is returned to the controller 122, and no subsequent step is performed; otherwise, step c2' is performed.

Step c2': Query whether the data exists in a flash chip and a DRAM cache, and perform step c3' or step c4' based on a query result.

Specifically, the master controller 211 queries whether the 8 KB page data exists in data cached in the flash chip and the DRAM chip, and sequentially perform the following steps based on the querying. When the full-page data is found in the DRAM cache chip, step c3' is performed. Alternatively, when the full-page data is found in the flash chip, step c4' is performed.

Step c3': Read the data from the DRAM cache, combine the data with the data read in step c1', and return the combined data. In this case, a copy of to-be-read page data is cached in the DRAM chip, and subpage data of the page is written to the SCM later. After the page data is read from the DRAM cache, the page data is combined with the subpage data read from the SCM chip, and the combined data is returned. Detailed content is similar to that in step c4.

Step c4': Read the data from the flash chip, combine the data with the data read in step c1', and return the combined data. Refer to content in step c4.

Embodiment 1 of the present disclosure further provides a data deletion method. A specific example is provided below.

D. Data Deletion

When the controller 122 initiates a secure deletion (for example, TRIM) command, the master controller 211 invokes a deletion command of a hard drive to implement secure deletion and secure erasure on a specified page. First, the master controller 211 needs to query whether an index of the page address exists in translation layers of the SCM chip and the flash chip. If the index of the page address exists, for data in the flash, all other valid pages in a block in which the page is located need to be migrated to another block, and then data of the block is erased; and for data in the SCM chip, data of all subpages in a corresponding root page at the SCM translation layer needs to be deleted, and data in an old address is set to zero.

When initiating a common delete operation, the controller 122 only needs to delete a specified page address from indexes at the translation layers of the SCM and the flash.

As more and more data are written to the flash of the storage system 120, more and more data is modified, and much data becomes invalid data. Invalid data (also referred to as junk data) refers to data that is not pointed to by any mapping relationship. In contrast, data that is pointed to by a mapping relationship is valid data. The invalid data occupies a large amount of storage space. Therefore, garbage collection (GC) is required.

Embodiment 1 of the present disclosure further provides a corresponding garbage collection method. The method may be applied to the system 120 in FIG. 3. In a possible implementation, a garbage collection operation is performed by the master controller 211. A specific example is provided below.

E. Garbage Collection

When there is a small quantity of blank pages in the flash, the master controller 211 initiates a GC operation, selects a block with most invalid pages from all blocks in the flash chip, and migrates a valid flash page in the block and some subpages that are stored in the SCM chip and that belong to the valid flash page to a newly allocated page in the flash chip. FIG. 13A is a flowchart of a GC method according to Embodiment 1 of the present disclosure. Steps are as follows:

Step e1: Determine a valid page in a to-be-collected block.

For example, the master controller 211 selects a block with most invalid pages from blocks of the flash chip, reads a valid flash page in the block, and migrates the valid flash page to another block.

Step e2: Read subpage data in an SCM chip.

Subpage data of a valid page (for example, with a logical address being LA5) is read from the SCM memory. For example, if three pieces of subpage data are found through subpage indexes of a specified page in the SCM, the three pieces of subpage data are read into a memory of the controller 211.

Step e3: Read page data in a flash chip.

Data of the specified page LA5 is read from the flash into the memory of the controller 211. If data in the SCM in step e2 is full-page data, in this step, the data of the page does not need to be read from the flash, and the data of the SCM chip is entirely used.

Step e4: Combine the data read from the SCM chip and the flash chip.

The master controller 211 performs a combination operation on the subpage data read from the SCM chip and the data read from the page in the flash. If data in the SCM chip in step e2 is full-page data, the combination operation does not need to be performed in this step, and step e5 is directly performed to write data.

Step e5: Write new data to the flash chip and update an index.

The combined data is written to a newly allocated storage location PA6 in the flash, and a new index (pointing to PA6) of LA5 is created in the FTL, in other words, indexes of two levels in the SCM and an old index in the flash are deleted. Finally, data in the to-be-collected block is erased.

When the SCM space reaches or approaches saturation, data in the SCM needs to be migrated to the flash, to ensure that the SCM has sufficient space for subsequent byte-level write. For example, the master controller 211 periodically queries free capacity space of the SCM, and needs to start a background task of subpage migration if it is found that used capacity of the SCM exceeds a threshold, for example, 80%.

Therefore, Embodiment 1 of the present disclosure further provides a data migration method. The method may be applied to the system 120 in FIG. 3. In a possible implementation, an operation on data is performed by the master controller 211. A specific example is provided below.

F. Data Migration Operation

In a possible implementation, to ensure optimal performance, a page with a highest aggregation degree, namely, a page with most subpages, may be selected from the SCM, and the page is evicted from SCM space. In addition, a data migration algorithm may further consider a time attribute. A page with longest time is preferentially selected. FIG. 13B is a flowchart of a data migration method according to an embodiment of the present disclosure. Steps are as follows:

Step f1: Determine a to-be-migrated page in an SCM chip.

First, all root pages in the hash table are traversed, and a quantity of valid subpages in all the root pages is counted. Then, an update time interval of each root page is calculated, to be specific, a difference between time when a current task is started and previous update time of a page is calculated. Finally, proportional weighting is performed on the two time. For example, Migration metric=Update time interval*$W_1$+Quantity of subpages*$W_2$, where $W_1$ and $W_2$ are weights of the two dimensions. N pages that most need to be migrated are calculated. In other words, N pages with largest migration metrics are calculated. A value of N may be set to be adjustable based on a water level of the SCM. Larger used capacity of the SCM indicates that a quantity of subpages that need to flow at a time also needs to be increased correspondingly. It is assumed that a root page A is determined in this step as a to-be-migrated page A currently.

Step f2: Read subpage data in the SCM chip.

Subpage data of the to-be-migrated page A is read from the SCM chip. Refer to content in step f2.

Step f3: Read page data in a flash chip.

For each 8 KB page A that needs to be migrated, the controller 211 determines whether the page A in the SCM is a full page.

When SCM data read in step f2 is a full page A, the operation of reading a page from the flash does not need to be performed, and data of the SCM is entirely used.

Alternatively, when the SCM data read in step f2 is not a full page, assuming that data of a subpage C in the page A is missing, data of a page B is read from the flash into the memory of the controller 211 based on a logical address (a root page address and a subpage address) of the to-be-migrated page. Then, the data of the page B is combined with all subpages of the page A in the SCM. Specifically, data that belongs to the subpage C in the data of the page B is obtained and read out, and is combined with all subpages of the page A in the SCM into full-page data.

Step f4: Combine the data read from the SCM and the flash.

Specifically, subpage data of the page A read from the SCM is used to overwrite data at a same location in the page B in the flash. In other words, complete data of the page A and a piece of 64 B data in the page B are used to form new 8 KB page data. Refer to the foregoing combination operation.

Step f5: Write the data to the flash chip, and update an index.

The controller 211 writes the combined data in step f3 to a newly allocated page address in the flash, and after the writing succeeds, modifies an index corresponding to the 8 KB page in the flash, so that the index points to a new location. After the index is successfully updated, the controller 211 deletes data corresponding to all subpages and related indexes in the 8 KB page in the SCM and the flash to complete an operation procedure of data migration Tier-Down.

In addition, for a DRAM cache eviction policy, when capacity of a DRAM reaches a specific water level, the DRAM eviction policy is triggered. An eviction algorithm that may be selected to use includes least recently used (LRU), least frequently used (LFU), or the like. Details are not described in detail herein.

Figure 14:
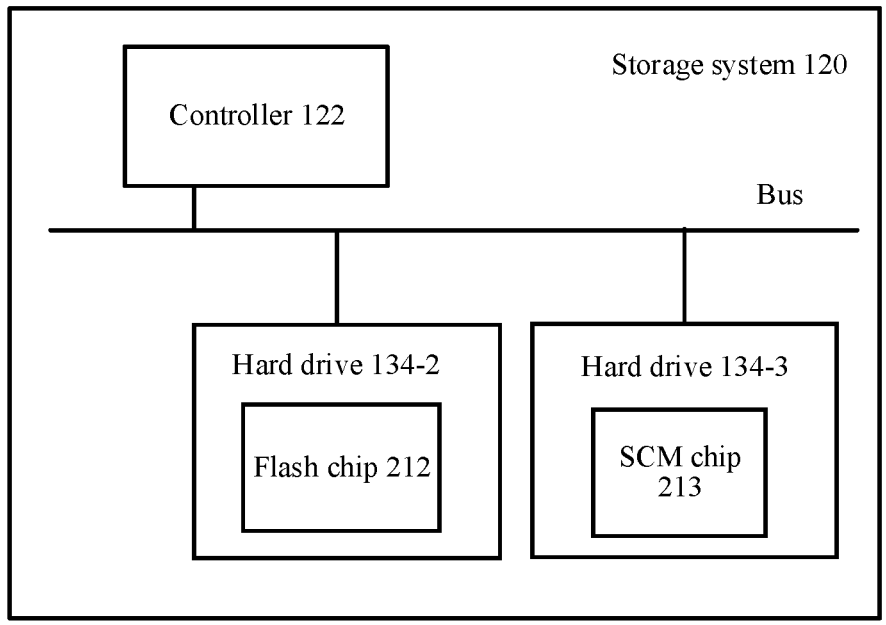
FIG. 14 is a schematic diagram of an internal structure of a storage system according to an embodiment of the present disclosure.

FIG. 14 is a schematic diagram of another structure of the storage system 120 according to an embodiment of the present disclosure. The storage system 120 may be applied to the storage architecture in FIG. 1 or FIG. 2. The methods in embodiments of the present disclosure may also be applied to the storage system 120 shown in FIG. 14.

In FIG. 14, the storage system 120 includes two types of hard drives: a hard drive 134-2, which is a flash medium-based storage device, and a hard drive 134-3, which is an SCM medium-based storage device. The two types of hard drives are the hard drive 134 in FIG. 1 or FIG. 2. A difference from the storage system 120 shown in FIG. 3 lies in that the flash chip 212 and the SCM chip 213 are located in two hard drives 134.

There are two types of hard drive 134, where the hard drive 134-2 is the flash-based storage device, and the hard drive 134-3 is the SCM-based storage device. The hard drive 134-2 includes one or more flash chips 212, the hard drive 134-3 includes one or more SCM chips 213, and the flash chip 212 and the SCM chip 213 are configured to store data written to the hard drives.

In a possible implementation, the hard drives 134-2 and 134-3 may be raw devices. To be specific, related functions originally implemented by the hard drive controller 211, such as operations such as a translation layer, garbage collection, data flow, and data combination, may be transferred to the controller 122 for implementation. In a possible implementation, the hard drives 134-2 and 134-3 may include a master controller (not shown in FIG. 14), which implements some simple functions such as sending/receiving instructions, while a complex data processing function still needs to be transferred to the controller 122 to implement.

Embodiment 2

Figure 15:
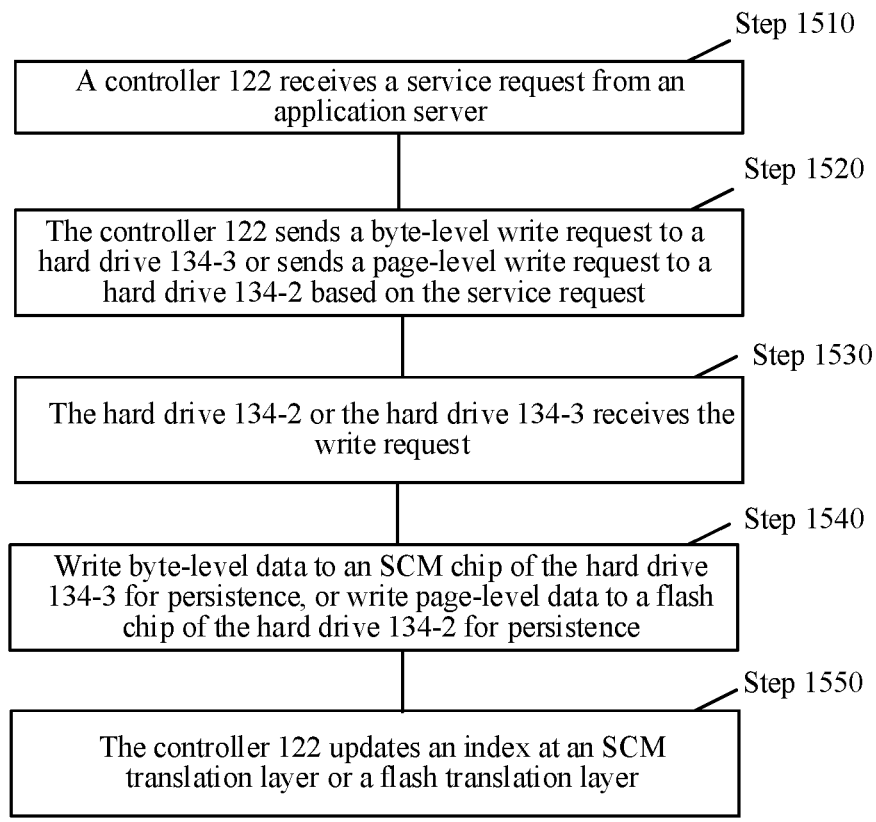
FIG. 15 is a schematic flowchart of a method for writing data to a storage device according to an embodiment of the present disclosure.

Based on the storage system 120 in FIG. 14, FIG. 15 is a schematic flowchart of a method for writing data to a storage device according to Embodiment 2 of the present disclosure.

In Embodiment 2, a unified software management layer is provided above driver layers of an SCM storage device and a flash storage device. The driver layers are installed in a controller 122. The software management layer provides a byte interface and a page interface for an operating system, writes byte-level data to the SCM storage device, and writes page-level data to the flash storage device. In a possible implementation, an application does not aware of locations to which the foregoing data is written. A function of the software layer may be performed by a processor of the controller 122, and a function of the software management layer may be further used to manage translation layers of the SCM device and the flash device. In addition, a garbage collection operation and a data migration operation are performed in the controller 122, and need to consume some CPU resources of the controller 122.

FIG. 15 is a schematic flowchart of a method for writing data to a storage device according to Embodiment 2 of the present disclosure. The method may be applied to the storage system shown in FIG. 1, FIG. 2, or FIG. 14. Steps are as follows:

Step 1510: The controller 122 receives a service request from an application server.

The controller 122 receives a request that is from the application server or that is generated by an internal application of the storage system 120. Refer to the foregoing similar descriptions.

Step 1520: The controller 122 sends a page-level write request to the hard drive 134-2 or sends a byte-level write request to the hard drive 134-3 based on the service request.

After the controller 122 receives an access request, a processor 123 of the controller 122 sends a page-level or page-level data write request instruction to the hard drive 134-2 or the hard drive 134-3 respectively through a page-level interface provided by a driver software of the hard drive 134-2 and a byte-level interface provided by a driver software of the hard drive 134-3.

In a possible implementation, when a size of data in the write request is less than one flash page, the software management layer sends the write instruction to a driver layer of the SCM device 134-3, and the driver layer sends the write instruction to the SCM storage device 134-3. Alternatively, when a size of data in the write request is equal to one flash page, the software management layer sends the write instruction to a driver layer of the flash device 134-2, and the driver layer sends the write instruction to the flash device 134-2.

In a possible implementation, before the data request is sent to the hard drive 134-2 or the hard drive 134-3, optimization processing of a file system and an I/O scheduler in a kernel are further involved to further improve small I/O data (byte level) write efficiency. For this part, refer to the foregoing descriptions in step 820.

Step 1530: The hard drive 134-2 or the hard drive 134-3 receives the write request.

The hard drive 134-2 or the hard drive 134-3 separately receives the page-level write request or the byte-level write request. For example, the hard drive 134-2 receives 8 KB write data through a page-level write interface, and the hard drive 134-3 receives 64 B write data through a byte-level write interface. For content carried in the request, refer to the foregoing descriptions in step 830.

Step 1540: Write byte-level data to an SCM chip for persistence, or write page-level data to a flash chip for persistence.

The hard drive 134-2 is a flash device. After receiving the write request, a master controller (not shown in the figure) of the hard drive 134-2 persistently writes page data to the flash chip. The hard drive 134-3 is an SCM device. After a master controller (not shown in the figure) of the hard drive 134-3 receives the write request, the hard drive 134-3 persistently writes the byte-level data to the SCM chip.

Step 1550: The controller 122 updates an index at an SCM translation layer or a flash translation layer.

The SCM translation layer or the flash translation layer in Embodiment 2 is the same as those in step 850 in Embodiment 1, in other words, the SCM chip uses the translation layers of two levels in FIG. 6, and the flash chip uses a conventional FTL. For related content, refer to the foregoing descriptions. It should be noted that in Embodiment 2, index update and management at the translation layer are moved up to the controller 122 to implement.

Embodiment 2 also provides methods such as A, B, C, D, E, and F in Embodiment 1, that is, byte-level write, page-level write, page-level read, data deletion, garbage collection, data migration, and the like. For specific steps, refer to the descriptions in Embodiment 1. A difference in this step in Embodiment 2 from Embodiment 1 lies in that operations such as data migration, garbage collection, and data combination are also implemented by the controller 122. When performing the methods in Embodiment 1 and Embodiment 2, the methods may be implemented by invoking instructions by a processor in a corresponding controller (122 or 211).

In an optional implementation, steps performed by the controller 122 in Embodiment 2, for example, operations such as translation layer management, data flow, garbage collection, and data combination, may alternatively be performed by the control unit 131 in FIG. 3. Optionally, when there is no control unit 131 inside the hard drive enclosure 130, the steps may alternatively be performed by the foregoing smart network interface card.

Figure 16:
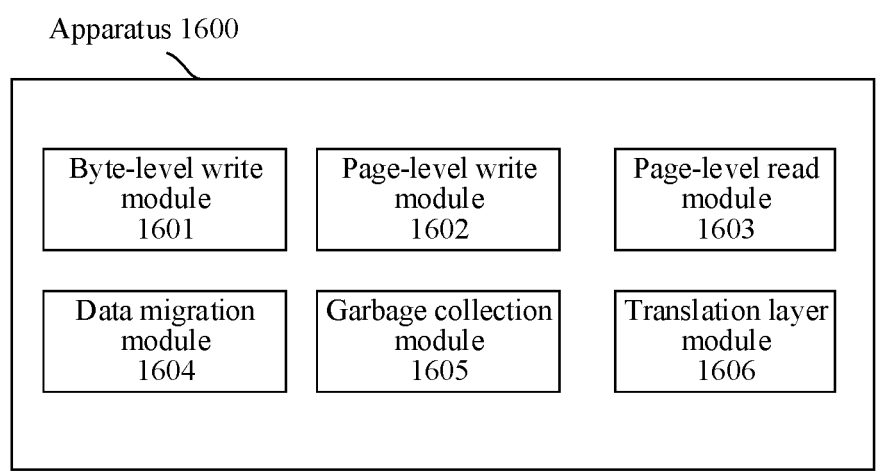
FIG. 16 is a schematic diagram of a structure of an apparatus according to an embodiment of the present disclosure.

FIG. 16 is a schematic diagram of a structure of an apparatus 1600 according to an embodiment of the present disclosure. The apparatus 1600 may be applied to a storage system 120, to implement the methods in Embodiment 1 and Embodiment 2 of the present disclosure. The apparatus may include a byte-level write module 1601, a page-level write module 1602, a page-level read module 1603, a data migration module 1604, a garbage collection module 1605, and a translation layer module 1606. Details are as follows:

The byte-level write module 1601 is configured to receive a first write request through a byte-level write interface, where the first write request carries to-be-written first data, and a length of the first data is less than a size of a flash page.

Optionally, the first data is written to an SCM chip of the SSD for persistent storage.

Optionally, after the first data is written to an SCM chip of the SSD for persistent storage, a copy of the first data is cached in the DRAM chip.

The page-level write module 1602 is configured to receive a second write request through a byte-level write interface, where the second write request carries to-be-written second data, and the length of the first data is equal to a size of one flash page.

Optionally, the second data is written to a flash chip of the SSD for persistent storage.

Optionally, after the first data is written to an SCM chip of the SSD for persistent storage, the page-level write module 1602 is further configured to cache a copy of the first data in the DRAM chip.

Optionally, when data stored in the SCM chip includes data that is the same as at least some data in the second data, the data that is the same as the at least some data and that is stored in the SCM chip is deleted.

The page-level read module 1603 is configured to receive a first read request through a page-level read interface to read the second data, where the first read request carries a logical address of the second data; determine, based on the logical address of the second data, whether the SCM chip has stored third data with a root page address same as that of the second data; when the SCM chip has stored the third data, read the third data from the SCM chip and the second data from the flash chip based on the logical address of the second data; and combine the read third data and second data into full-page data and return the full-page data.

Optionally, the reading the third data from the SCM chip based on the logical address of the second data includes obtaining the root page address of the second data based on the logical address of the second data; obtaining a subpage address of the third data based on the root page address of the second data; and obtaining a physical address of the third data based on the subpage address of the third data, and reading the third data based on the physical address of the third data.

Optionally, when reading the first data from the SCM chip, it is determined whether a copy of the first data exists in the DRAM chip. If the copy of the first data exists in the DRAM chip, the first data is read from the DRAM chip and returned. If the copy of the first data does not exist in the DRAM chip, the first data is read from the SCM chip.

Optionally, when reading the second data from the flash chip, it is determined whether a copy of the second data exists in the DRAM chip. If the copy of the second data exists in the DRAM chip, the second data is read from the DRAM chip and returned. If the copy of the second data does not exist in the DRAM chip, the second data is read from the flash chip.

The data migration module 1604 is configured to migrate the first data and other data to the flash chip at a granularity of a page, where the other data and the first data belong to a same root page, and the other data is located in the SCM chip or the flash chip before the migration.

The data migration module 1604 is specifically configured to determine a to-be-migrated first root page in an SCM chip, where the SCM chip is located in a flash SSD; read data corresponding to the first root page from the SCM chip and/or the flash chip, where the flash chip is located in the flash SSD; and combine or directly write the data corresponding to the first page to the flash chip.

Optionally, when the data corresponding to the first root page read from the SCM chip is full-page data, the data corresponding to the first root page is read from the SCM chip, and written to the flash chip.

Optionally, when the data corresponding to the first root page read from the SCM chip is not full-page data, the data corresponding to the first root page is separately read from the SCM chip and the flash chip, and is combined and written to the flash chip.

Optionally, the data corresponding to the first root page in the SCM chip is deleted.

Optionally, an index corresponding to the first root page is deleted, and a new index is created.

Optionally, a to-be-migrated root page in the SCM chip is determined based on a page aggregation degree, where the page aggregation degree is a quantity of subpages included in a root page in the SCM chip, and the root page is formed by a plurality of subpages.

Optionally, a root page with a higher page aggregation degree or a root page with earlier previous update time is preferentially determined as the to-be-migrated root page.

The garbage collection module 1605 is configured to determine a to-be-collected first block in the flash chip, where the first block includes at least a first part of data and a second part of data, the first part of data is located in the SCM chip, the second part of data is located in the flash chip, and the first part of data and the second part of data are valid data; read the first part of data from the SCM chip, and read the second part of data from the flash chip; write the first part of data and the second part of data to a second block in the flash chip; and erase the first block.

The translation layer module 1606 is configured to obtain a root page address and a subpage address of the first data based on a logical address of the first data that is further carried in the first write request; and store an index relationship between the root page address and the subpage address and an index relationship between the subpage address and a first physical address, where the first physical address is a physical address at which the first data is written to the SCM chip for persistence.

Optionally, when reading the third data from the SCM chip based on the logical address of the second data, the translation layer module may be configured to: obtain the root page address of the second data based on the logical address of the second data; obtain a subpage address of the third data based on the root page address of the second data; and obtain a physical address of the third data based on the subpage address of the third data, and read the third data based on the physical address of the third data.

For detailed content of the methods in the foregoing modules, refer to related descriptions in Embodiment 1 and Embodiment 2. In practice, the module division manner of the apparatus 1600 may be another manner. FIG. 16 is merely an example.

The byte-level write interface, the page-level write interface, and the page-level read interface may be software programming interfaces. The software programming interfaces can identify different operation instructions and content thereof to implement functions of byte-level write, page-level write, and page-level read.

In a possible implementation, the byte-level write interface and the page-level write interface may be configured to identify a same operation instruction, for example, both are a same write instruction. In other words, the two interfaces are collectively referred to as a write interface. A difference between the two is that a length of data carried in an instruction is different. A data length identified by the byte-level write interface is less than a size of a flash page, and a data length identified by the page-level write interface is equal to a size of a flash page. Optionally, the byte-level write interface and the page-level write interface may alternatively be two write interfaces that implement different write instructions.

In an optional implementation, the byte-level write interface, the page-level write interface, and the page-level read interface may alternatively be interfaces implemented in a hardware manner. For example, different physical interfaces and data lines are used to communicate with an upper-layer device to implement different functions (byte-level write, page-level write, and page-level read). For another example, different functions are implemented through devices in different hardware modules.

Optionally, the three types of interfaces may alternatively be implemented by software in combination with hardware. A specific implementation is not limited in the present disclosure.

It should be noted that embodiments provided in the present disclosure are merely examples. A person skilled in the art may clearly know that, for convenience and conciseness of description, in the foregoing embodiments, the embodiments emphasize different aspects, and for a part not described in detail in one embodiment, refer to related descriptions in another embodiment. Features disclosed in embodiments, claims, and accompanying drawings of the present disclosure may exist independently or exist in a combination. Features described in a hardware form in embodiments of the present disclosure may be executed by software, and vice versa. This is not limited herein.

A person skilled in the art may understand that all or some of the steps of the method embodiments may be implemented by a program instructing related hardware. The program may be stored in a computer-readable storage medium. When the program runs, all or some steps of the method embodiments are performed. The foregoing storage medium includes any medium that can store program code, such as a ROM, a RAM, a magnetic drive, or an optical disc.

All or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, another computer, another server, or another data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy drive, a hard drive, or a magnetic tape), an optical medium, a semiconductor medium (for example, an SSD), or the like.

In the several embodiments provided in the present disclosure, it should be understood that the disclosed apparatus and method may be implemented in other manners. For example, the described embodiments are merely examples. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. A person of ordinary skill in the art may understand and implement embodiments of the present disclosure without creative efforts.

In addition, the apparatus and method described herein, and schematic diagrams of different embodiments can be combined or integrated with other systems, modules, technologies, or methods without departing from the scope of the present disclosure. In addition, the displayed or discussed mutual couplings or direct couplings or communication connections may be implemented through some interfaces. The indirect couplings or communication connections between the apparatuses or units may be implemented in electronic, mechanical, or other forms.

What is claimed is:

1. A method for writing data to a solid-state drive, wherein the method comprises:
   providing a first interface and a second interface concurrently, wherein the first interface is a byte-level write interface and the second interface is a page-level write interface;
   receiving a first write request through the first interface, wherein the first write request carries first data, and wherein a first length of the first data is less than a first size of one flash page;
   receiving a second write request through the second interface, wherein the second write request carries second data, and wherein a second length of the second data is equal to a second size of one flash page;
   writing the first data to a storage class memory (SCM) chip of the solid-state drive for persistent storage, wherein the first length is greater than or equal to a minimum management unit of the SCM chip;
   writing the second data to a flash chip of the solid-state drive for persistent storage;
   receiving a first read request through a page-level read interface to read the second data, wherein the first read request carries a logical address of the second data;
   determining, based on the logical address, whether the SCM chip has stored third data with a root page address the same as that of the second data;
   reading, when the SCM chip has stored the third data, the third data from the SCM chip and the second data from the flash chip based on the logical address;
   combining the third data and second data into full-page data; and
   returning the full-page data.

2. The method of claim 1, wherein the method further comprises caching a copy of the second data in a dynamic random-access memory (DRAM) chip of the solid-state drive.

3. The method of claim 1, wherein writing the first data to the SCM chip for persistent storage comprises storing the first data at a granularity of the minimum management unit.

4. The method of claim 1, wherein the first write request further carries a logical address of the first data, wherein an address at which the first data is written to the SCM chip is a first physical address, and wherein the method further comprises:
   obtaining a root page address and a subpage address of the first data based on the logical address;
   storing a first index relationship between the root page address and the subpage address; and
   storing a second index relationship between the subpage address and the first physical address.

5. The method of claim 1, wherein after the writing the second data to a flash chip for persistent storage, the method further comprises deleting, when at least some data stored in the SCM chip is the same as at least some data in the second data, the at least some data stored in the SCM chip.

6. The method of claim 1, wherein reading the third data comprises:
   obtaining the root page address of the second data based on the logical address;
   obtaining a subpage address of the third data based on the root page address;
   obtaining a physical address of the third data based on the subpage address; and
   reading the third data based on the physical address.

7. A method, implemented by a storage system, for writing data to a storage device, and comprising:
   sending, by a controller of the storage system, a first write request to a storage class memory (SCM) storage device of the storage system and a second write request to a flash storage device of the storage system concurrently, wherein the first write request carries first data and the second write request carries second data, and wherein a first length of the first data is less than a first size of one flash page and a second length of the second data is equal to a second size of one flash page;
   receiving, by the SCM storage device, the first write request through a first interface, wherein the first interface is a byte-level write interface;
   receiving, by the flash storage device, the second write request through a second interface, wherein the second interface is a page-level write interface;
   persistently storing, by the SCM storage device, the first data, wherein the first length is greater than or equal to a minimum management unit of the SCM storage device; and
   persistently storing, by the flash storage device, the second data;
   sending, by the controller, a first read request to the flash storage device to read the second data, wherein the first read request carries a logical address of the second data;
   determining, based on the logical address, whether the SCM storage device has stored third data with a root page address the same as that of the second data;
   reading, when the SCM storage device has stored the third data, the third data from the SCM storage device and the second data from the flash storage device based on the logical address;
   combining the third data and second data into full-page data; and
   returning the full-page data.

8. The method of claim 7, further comprising:
   caching, in a dynamic random-access memory (DRAM) chip of the storage system, a copy of the second data.

9. The method of claim 8, wherein persistently storing, by the SCM storage device, the first data comprises storing the first data at the minimum management unit.

10. The method of claim 8, wherein the first write request further carries a logical address of the first data, wherein an address at which the first data is written to the SCM storage device is a first physical address, and wherein the method further comprises:
    obtaining, by the controller, a root page address and a subpage address of the first data based on the logical address;

storing, by the controller, a first index relationship between the root page address and the subpage address; and storing, by the controller, a second index relationship between the subpage address and the first physical address.

11. The method of claim 8, wherein after the persistently storing, by the flash storage device, the second data, the method further comprises:

deleting, by the controller, when at least some data stored in the SCM storage device is the same as at least some data in the second data, the at least some data stored in the SCM storage device.

12. The method of claim 7, wherein reading the third data comprises:

obtaining, by the controller, the root page address of the second data based on the logical address;

obtaining, by the controller, a subpage address of the third data based on the root page address;

obtaining, by the controller, a physical address of the third data based on the subpage address; and reading the third data based on the physical address.

13. A storage system comprising:

a controller configured to:

send a first write request and a second write request concurrently, wherein the first write request carries first data, wherein a first length of the first data is less than a first size of one flash page, wherein the second write request carries second data, and wherein a second length of the second data is equal to a second size of one flash page;

a storage class memory (SCM) storage device configured to:

receive the first write request through a first interface, wherein the first interface is a byte-level write interface; and persistently store the first data, wherein the first length is greater than or equal to a minimum management unit of the SCM storage device; and a flash storage device configured to:

receive the second write request through a second interface, wherein the second interface is a page-level write interface; and persistently store the second data;

wherein the controller is further configured to:

send a first read request to the flash storage device to read the second data, wherein the first read request carries a logical address of the second data;

determine, based on the logical address, whether the SCM storage device has stored third data with a root page address the same as that of the second data;

read, when the SCM storage device has stored the third data, the third data from the SCM storage device and the second data from the flash storage device based on the logical address;

combine the third data and second data into full-page data; and return the full-page data.

14. The storage system of claim 13, further comprising a dynamic random-access memory (DRAM) chip configured to cache a copy of the second data.

15. The storage system of claim 14, wherein the SCM storage device is further configured to store the first data at a granularity of the minimum management unit.

16. The storage system of claim 14, wherein the first write request further carries a logical address of the first data, wherein an address at which the first data is written to the SCM storage device is a first physical address, and wherein the controller is further configured to:

obtain a root page address and a subpage address of the first data based on the logical address of the first data;

store a first index relationship between the root page address and the subpage address; and store a second index relationship between the subpage address and the first physical address.

17. The storage system of claim 14, wherein the controller is further configured to:

delete, when at least some data stored in the SCM storage device is the same as at least some data in the second data, the at least some data stored in the SCM storage device.

* * * * *